(12) United States Patent
Takei

(10) Patent No.: US 7,164,512 B2
(45) Date of Patent: Jan. 16, 2007

(54) DOCUMENT TRANSFER DEVICE AND IMAGE READING APPARATUS

(75) Inventor: Akira Takei, Yamanashi-ken (JP)

(73) Assignee: Nisca Corporation, Yamanashi-ken (JP)

( * ) Notice: Subject to any disclaimer, the term of this patent is extended or adjusted under 35 U.S.C. 154(b) by 935 days.

(21) Appl. No.: 10/151,290

(22) Filed: May 21, 2002

(65) Prior Publication Data

US 2003/0094562 A1    May 22, 2003

(30) Foreign Application Priority Data

Nov. 16, 2001    (JP) .............................. 2001-351109

(51) Int. Cl.
*H04N 1/04* (2006.01)
*G03G 15/00* (2006.01)
*B65H 5/00* (2006.01)

(52) U.S. Cl. ...................... 358/496; 358/497; 358/474; 399/367; 271/264

(58) Field of Classification Search ................ 358/496, 358/497, 474; 399/367; 271/264, 272
See application file for complete search history.

(56) References Cited

U.S. PATENT DOCUMENTS

| 4,579,444 | A | * | 4/1986 | Pinckney et al. ........... 399/372 |
| 5,513,017 | A | * | 4/1996 | Knodt et al. ................ 358/471 |
| 5,579,083 | A | * | 11/1996 | Naito et al. ................ 355/400 |

OTHER PUBLICATIONS

Patent Abstract of Japan, No. 06090322, publication date Mar. 29, 1994, Applicant Nisca Corporation.

* cited by examiner

*Primary Examiner*—Jerome Grant
*Assistant Examiner*—Houshang Safaipour
(74) *Attorney, Agent, or Firm*—Manabu Kanesaka

(57) ABSTRACT

A document transfer device for transferring a document to a document stop reference position includes a supply port disposed on an end of the contact glass; the first supply path for guiding the document supplying through the supply port to a downstream side along the contact glass; a contact glass cover forming the first supply path together with the contact glass and covering a part of the contact glass; and the second supply path joining the first supply path near a downstream side of the contact glass cover. The transfer device transfers the document from the first supply path or the second supply path to the document stop reference position.

8 Claims, 21 Drawing Sheets system

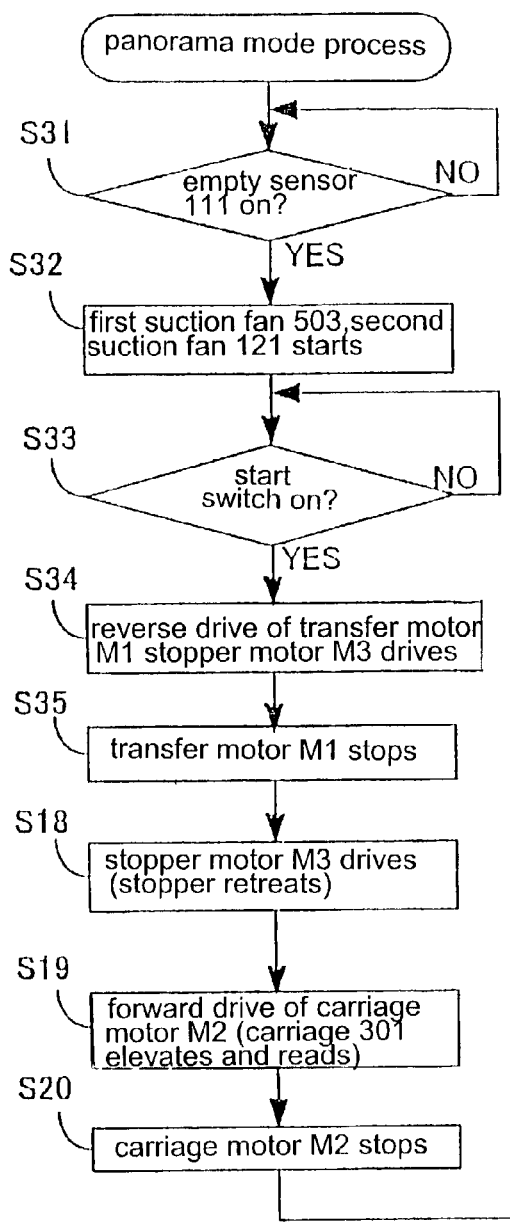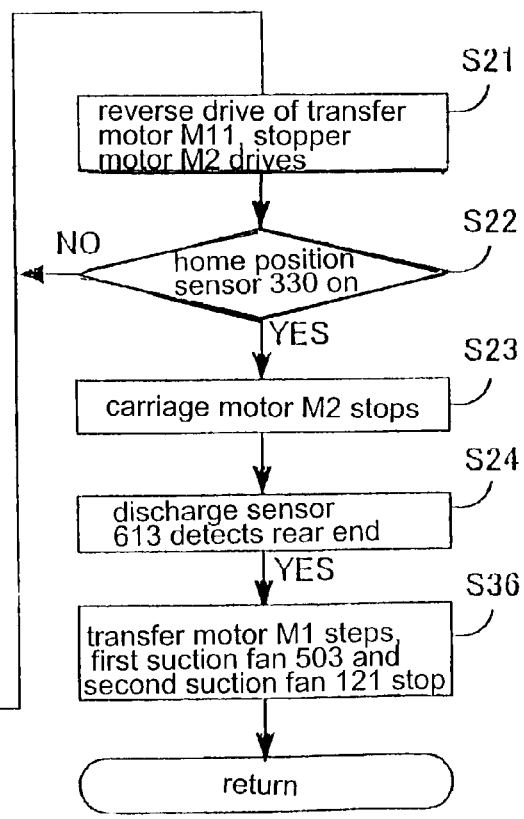
Fig. 19

DOCUMENT TRANSFER DEVICE AND IMAGE READING APPARATUS

BACKGROUND OF THE INVENTION AND RELATED ART STATEMENT

This invention relates to a document transfer device for transferring a document to a document stop reference position disposed at one end of a contact glass of an image reading apparatus, and an image reading apparatus having the same. Especially, this invention relates to a document transfer device having a transfer device for transferring a document to a document stop reference position disposed at one end of a contact glass and a contact glass cover for covering a remaining portion of the contact glass adjacent to the transfer device, and an image reading apparatus having the same.

Heretofore, as a document transfer device of this type, for example, there has been known a document transfer device having a structure as shown in FIGS. 20 and 21 (refer to Japanese Patent Publication, TOKKAI No. 06-90322).

The document transfer device includes a transfer belt 53 of a transfer device 50 covering a part of a contact glass 55, and a contact glass cover 41 (a main body of the contact glass cover) disposed adjacent to the transfer belt 53 to cover a remaining portion of the contact glass. A pick-up roller 23 takes the document mounted on a supply tray 11, and a supply roller 24 and a separation roller 25 separate the document one by one. Then, each separated sheet abuts against a nip point between a stopping resister roller 26 and a resister press roller 27 to thereby remove skew of the document. The transfer belt 53 transfers the document to a reference position P1, where reading is carried out. In the case that a register sensor S2 recognizes the document as a short size (a S-size), the document is transferred to the reference position P1 by clockwise rotation of the transfer belt 53 through forward rotation of a motor (not shown) as a driving source and then stopped. In the case the register sensor S2 recognizes the document as a long size (a L-size), the document is transferred by the clockwise rotation of the transfer belt 53 through the forward rotation of the motor. Then, the document stops after a predetermined time after a document discharge sensor S3 detects a leading edge of the document. At this time, a trailing edge of the document has passed through an adjacent portion R. Then, the document is transferred in a reverse direction by the counter-clockwise rotation of the transfer belt 53 through the reverse rotation of the motor. At this time, as shown in FIG. 21, link members 44 are rotated counter-clockwise by the reverse rotation of the motor M2 through a register roller shaft 48, a drive arm 46 and an engaging pin 45. Accordingly, a contact glass cover main body 41 is rotated around a supporting shaft 42 as a pivot and opened to the left side thereof to make a predetermined space "g". Then, the document is inserted into the space "g" and its reverse transfer is stopped after a very short time. The document is transferred forward by the transfer belt 53 through the forward rotation of the motor M2 and stopped at the reference position P1. Further, at this time, the contact glass cover main body 41 falls downward through clockwise rotation of the drive arm 46 and link members 44 by the forward rotation of the motor M2. With the structure as described above, a transfer distance to the reading position of the small-size document, which is used very often, is reduced to thereby shorten a transfer time.

However, in the above-stated apparatus, in the case of handling the long-size document, after the document is transferred forward, it is moved in reverse and then again transferred forward (switch-backed) to the reference position. Therefore, a transfer distance becomes very long to thereby take a long time.

In view of the above problem, the present invention has been made and an object of the invention is to provide a document transfer device, in which the transfer time of the short-size document is shortened and, at the same time, the transfer time/distance of the long size document is shortened with a simple structure.

Another object of the invention is to provide an image reading apparatus having such a document transfer device as described in the first object, in which an entire process time is shortened.

Further objectives and advantages of the invention will be apparent from the following description of the invention.

SUMMARY OF THE INVENTION

In order to attain the above objects, according to the first aspect of the invention, a document transfer device for transferring a document to a document stop reference position located at one end of a contact glass or platen of an image reading apparatus includes a supply port disposed at the other end of the contact glass; the first supply path for guiding the document inserted through the supply port along the contact glass to a downstream side; a contact glass cover forming the first supply path and covering a portion of the contact glass; the second supply path connected to the first supply path in a vicinity of a downstream end portion of the contact glass cover; and a transfer device disposed adjacent to the contact glass cover on the downstream side thereof for transferring the document from the first supply path or the second supply path to the document stop reference position through one directional rotation, and for covering the remaining portion of the contact glass.

According to the present invention having the structure described above, since the document transfer device includes the supply port, the first supply path and the contact glass cover, it is possible to transfer the document from the first supply path to the document stop reference position by the one directional rotation of the transfer device. Also, since there is provided the second supply path joining the first supply path in the vicinity of the downstream end portion of the contact glass cover, the document from the second supply path can also be transferred to the document stop reference position by the one directional rotation of the transfer device. Therefore, in the case that the document inserted through the first supply port is a long-size document, since the document can be transferred to the document stop reference position without making a switch-back, a transfer distance becomes short to thereby shorten a transfer time. Also, since a short-size document inserted through the second supply path is transferred to the document stop reference position without passing through the first supply path, the transfer distance is short to thereby shorten the transfer time.

According to the second aspect of the invention, an image reading apparatus includes a contact glass; a scanning device reading a document while moving along one side of the contact glass; and a document transfer portion disposed on the other side of the contact glass for transferring the document to a predetermined reading position where reading is carried out by the scanning device. The document transfer portion includes the first supply port provided to one end of the contact glass for inserting the document; the first supply path for guiding the document inserted through the first supply port along the contact glass; a contact glass cover forming the first supply path together with the contact glass and covering a part of the contact glass; the second supply path connected to the first supply path in the vicinity of the downstream end portion of the contact glass cover; and a transfer device disposed adjacent to the downstream side of the contact glass cover for transferring the document from the first or second supply path to a document stop reference position located on the other end portion of the contact glass through the one direction rotation, and for covering the remaining portion of the contact glass.

According to the present invention having the structure described above, as in the first aspect, the time for transferring the document to the document stop reference position can be shortened, so that the entire process time up to the document reading step can be reduced.

According to the third aspect of the invention, an image reading apparatus includes a contact glass disposed substantially vertically; a scanning device for reading a document while moving along one side of the contact glass; and a document transfer portion disposed on the other side of the contact glass for transferring the document to a predetermined reading position where reading is carried out by the scanning device. The document transfer portion includes a supply port provided to an upper end of the contact glass for inserting the document; the first supply path for guiding the document inserted through the supply port along the contact glass; a contact glass cover forming the first supply path together with the contact glass and covering the contact glass; the second supply path connected to the first supply path in the vicinity of a lower end portion of the contact glass cover; and a transfer device disposed adjacent to a lower portion of the contact glass cover for transferring the document from the first or second supply path to a document stop reference position located at a lower end portion of the contact glass through one direction rotation, and for covering the remaining portion of the contact glass.

According to the present invention having the structure described above, as in the second aspect of the invention, the time for transferring the document to the document stop reference position can be shortened, so that the entire process time including the document reading process can be reduced. Also, since the contact glass is disposed substantially vertically, an installation area of the apparatus can be reduced.

BRIEF DESCRIPTION OF THE DRAWINGS

FIG. 19 is a flow chart showing a panorama mode process subroutine of the image reading routine in FIG. 17;

DETAILED DESCRIPTION OF PREFERRED EMBODIMENT

Hereunder, with reference to the accompanying drawings, an embodiment in which the present invention is applied to an image reading apparatus for reading an image on a photograph will be explained. Incidentally, the image reading apparatus of the invention is installed in a system, for example, shown in FIG. 1. Using such a system, a photo processing shop can provide a service that the system reads an image on a photograph brought into by a customer or developed in the photo processing shop, and the image read by the apparatus is processed, compiled and stored in a storage media, such as a CD-ROM. The service also includes delivering the image by an electrical mail through the Internet. The system is connected to its host computer PC.

Figure 2:
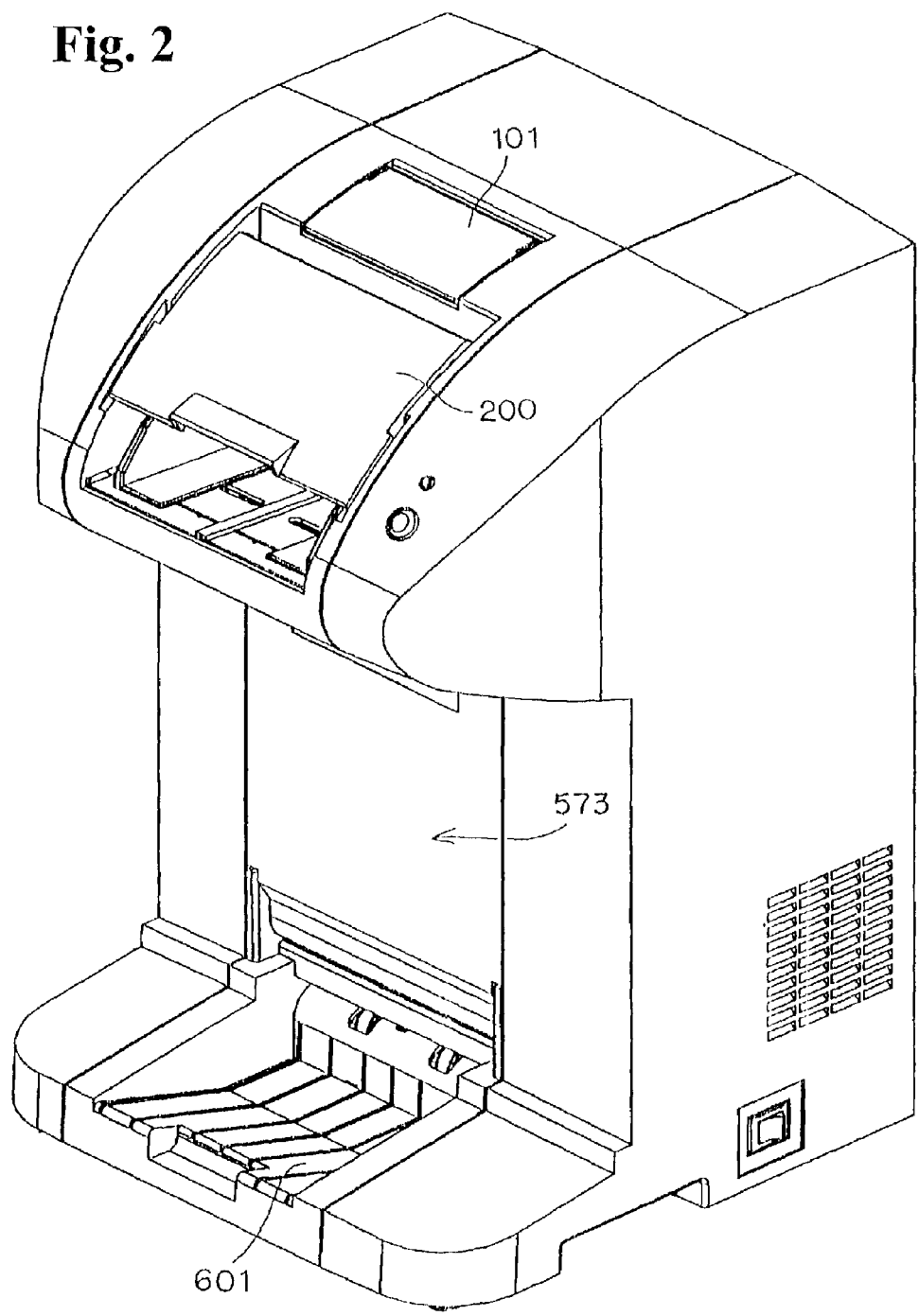
FIG. 2 is a perspective view of an image reading apparatus according to an embodiment of the invention.
Figure 3:
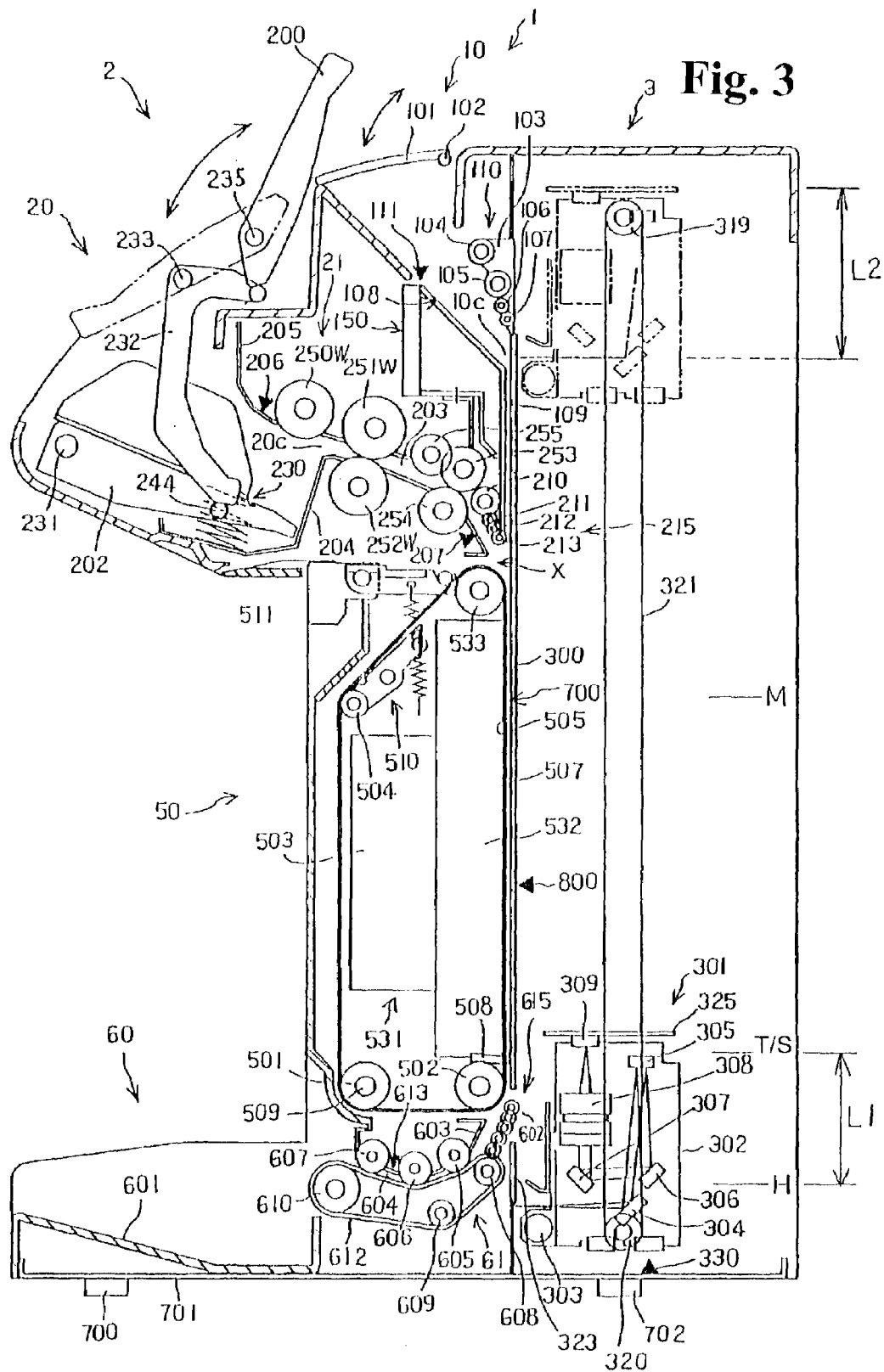
FIG. 3 is a side sectional view showing the image reading apparatus according to the embodiment of the invention in FIG. 2.

An image reading apparatus 1 of the embodiment as shown in FIG. 2 includes an image reading unit 3 for reading the image on the photograph as an original, and a transfer unit 2 for transferring the photograph to a predetermined reading position 800 where the image reading unit 3 reads the image, as shown in FIG. 3.

As shown in FIG. 3, the image reading unit 3 includes a contact glass or platen 300 formed of a transparent glass disposed substantially vertically; a white reference plate 323 positioned at a lower portion of the contact glass 300 for correcting shading; a carriage 301 (scanning device) for reading the image on the photograph while moving along the contact glass 300 over a distance corresponding to a length of the photograph; a driving system 310 for moving the carriage 301 vertically along the contact glass 300; and a home position sensor 330 for detecting the carriage 301.

Figure 4:
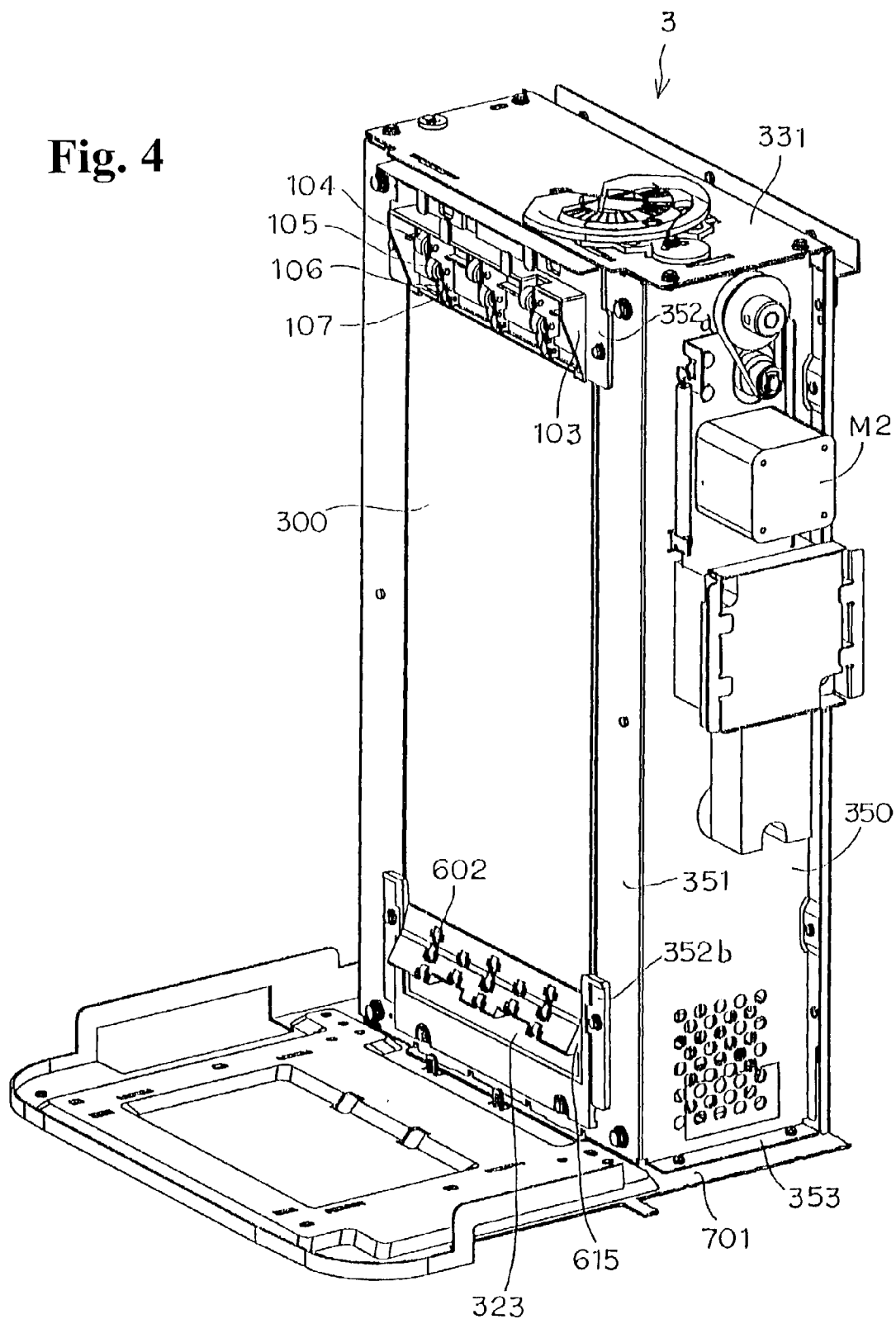
FIG. 4 is a perspective view showing a state in which a contact glass of an image reading unit is installed according to the embodiment of the invention in FIG. 2.

As shown in FIG. 4, the contact glass 300 is attached to a metal frame 350. The frame 350 includes an attaching surface 351 having a rectangular opening slightly smaller than the contact glass 300, and has a substantially U-shape section. The contact glass 300 is placed onto the opening of the attaching surface 351; the upper end thereof is sandwiched between a resin attaching member 352a and the attaching surface 351; the lower end thereof is sandwiched between a resin attaching member 352b and the attaching surface 351; and the respective upper and lower ends of the contact glass 300 are fixed to the attaching surface 351 of the frame 350 by screws from sides of the respective attaching members 352a and 352b. Rectangular supporting surfaces 353 extending in a direction perpendicular to the attaching surface 351 are formed at a lower end portion on both sides of the frame 350. The supporting surfaces 353 are fixed to a lower frame 701 constituting a bottom surface of the image reading apparatus 1 by screws from a lower surface side of the lower frame 701. The white reference plate 323 is attached to the lowest end of the opening of the attaching surface 351, in the same manner as the contact glass 300, by being sandwiched between the attaching member 352b and the attaching surface 351. Incidentally, on the installation surface side (a back side) of the lower frame 701, four resin legs 702 (installation device) for contacting an installation surface are fixed to the lower frame 701 with a predetermined space therebetween (shown in FIG. 3). Therefore, the contact glass 300 is fixed to the lower frame 701 to be substantially vertical, and further the contact glass 300 is substantially vertically supported with respect to the installation surface of the image reading apparatus 1 through an attachment of the resin legs 702 to the lower frame 701.

Also, a guide member 103 with a substantially triangular cross section is integrally formed with the attaching member 352a. Rollers 104, 105, 106, and 107, each consisting of three rollers, are horizontally disposed in a row with a space therebetween, and are attached to the guide member 103. Also, in the same manner, a rotor supporting portion 615 with a substantially R-shape cross section is integrally formed with the attaching member 352b. A plurality of rollers (rotors) 602 constituting a part of a curved discharge path 604 in an discharge portion 60, described later, is disposed in a zigzag pattern wherein outer peripheries of adjacent rollers overlap each other in a transfer (discharge) direction of the photograph.

Also, the contact glass 300 is flush with the white reference plate 323 in a vertical direction through the rotor supporting member 615.

Figure 5:
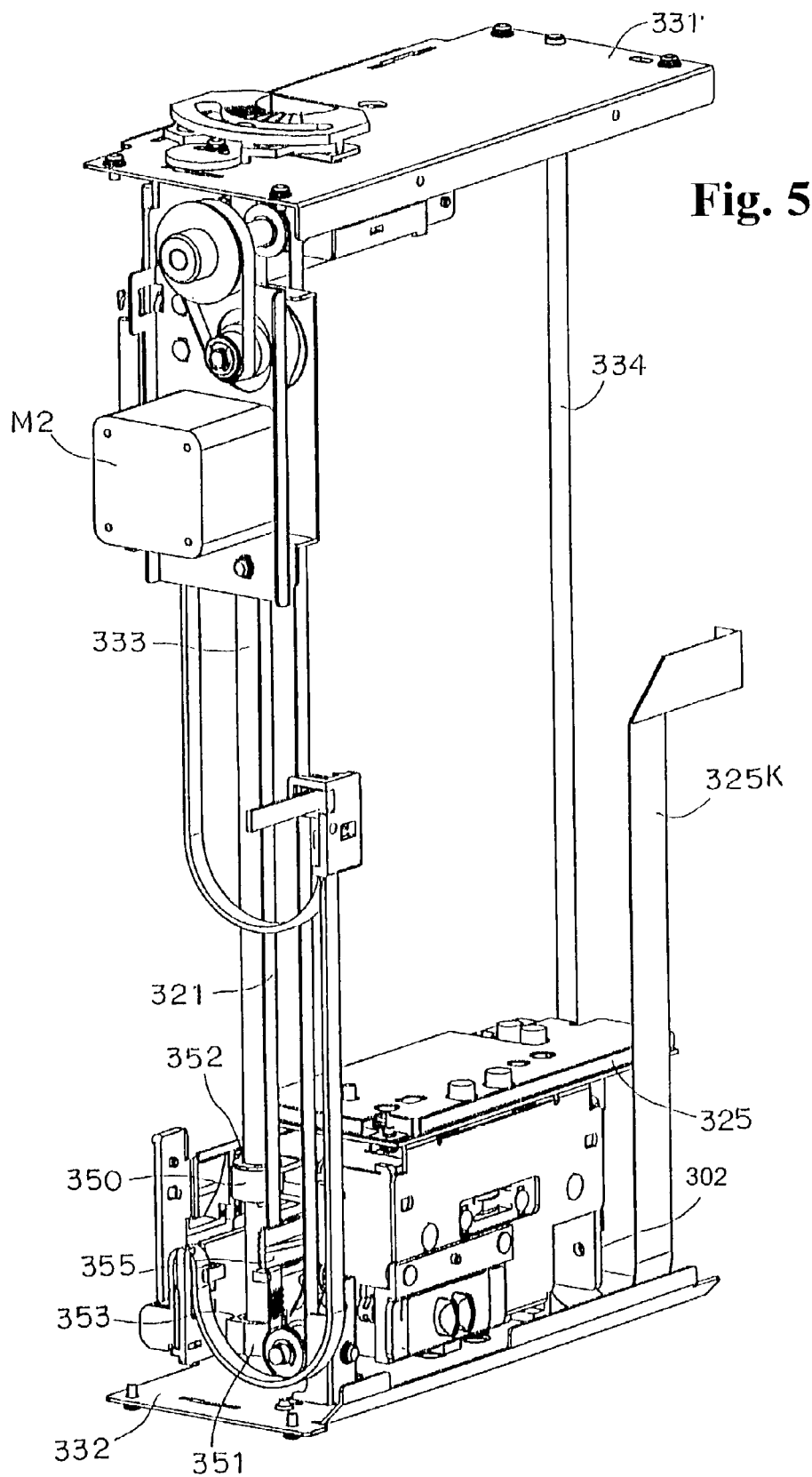
FIG. 5 is a perspective view showing a moving structure of a carriage of the embodiment of the invention in FIG. 2.
Figure 16:
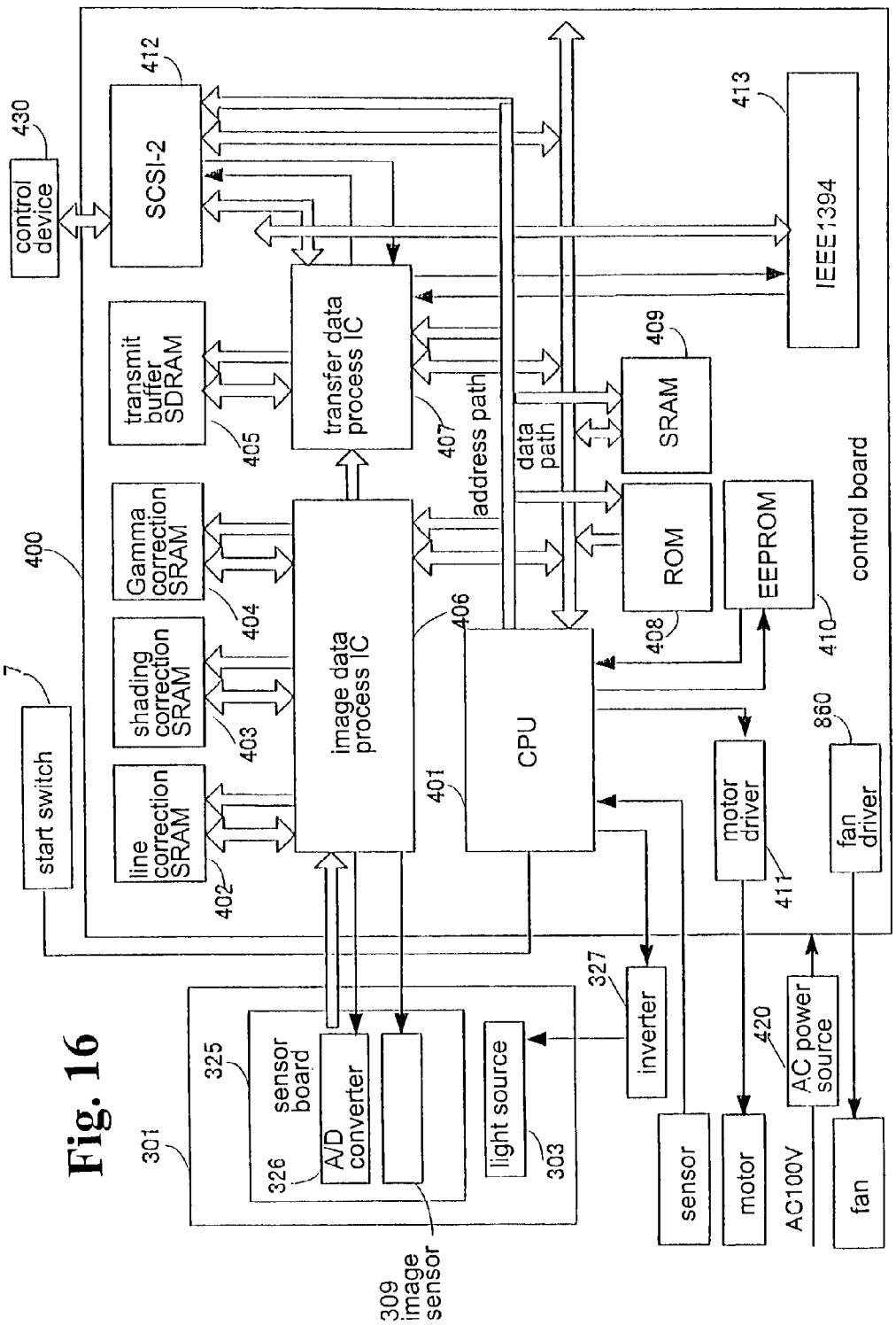
FIG. 16 is a block diagram showing a control portion.

As shown in FIGS. 3 and 5, the carriage 301 includes a carriage frame 302 made of a resin. Insides the carriage frame 302, there are housed and fixed thereto a bar-like light source 303, such as a Xenon lamp, for irradiating light to the photograph; a plurality of mirrors 304, 305, 306 and 307 for changing a light path of the reflected light from the photograph; and a lens unit 308 for allowing the reflected light from the mirror 307 to form an image. Further, a sensor board 325 is attached to an outside of the carriage frame 302. To the sensor board 325, there are attached a color image sensor 309 consisting of three CCDs for conducting photoelectric conversion of the reflected light of an image formed through the lens unit 308 by three RGB colors; an A/D converter for converting analog data from the color image sensor 309 to digital data; and a signal cable 325K (shown in FIG. 5) for transferring the image data and the like from the A/D converter to a control board 400, described later. Also, an inverter 327 turns on the light source 303 as shown in FIG. 16.

Figure 6:
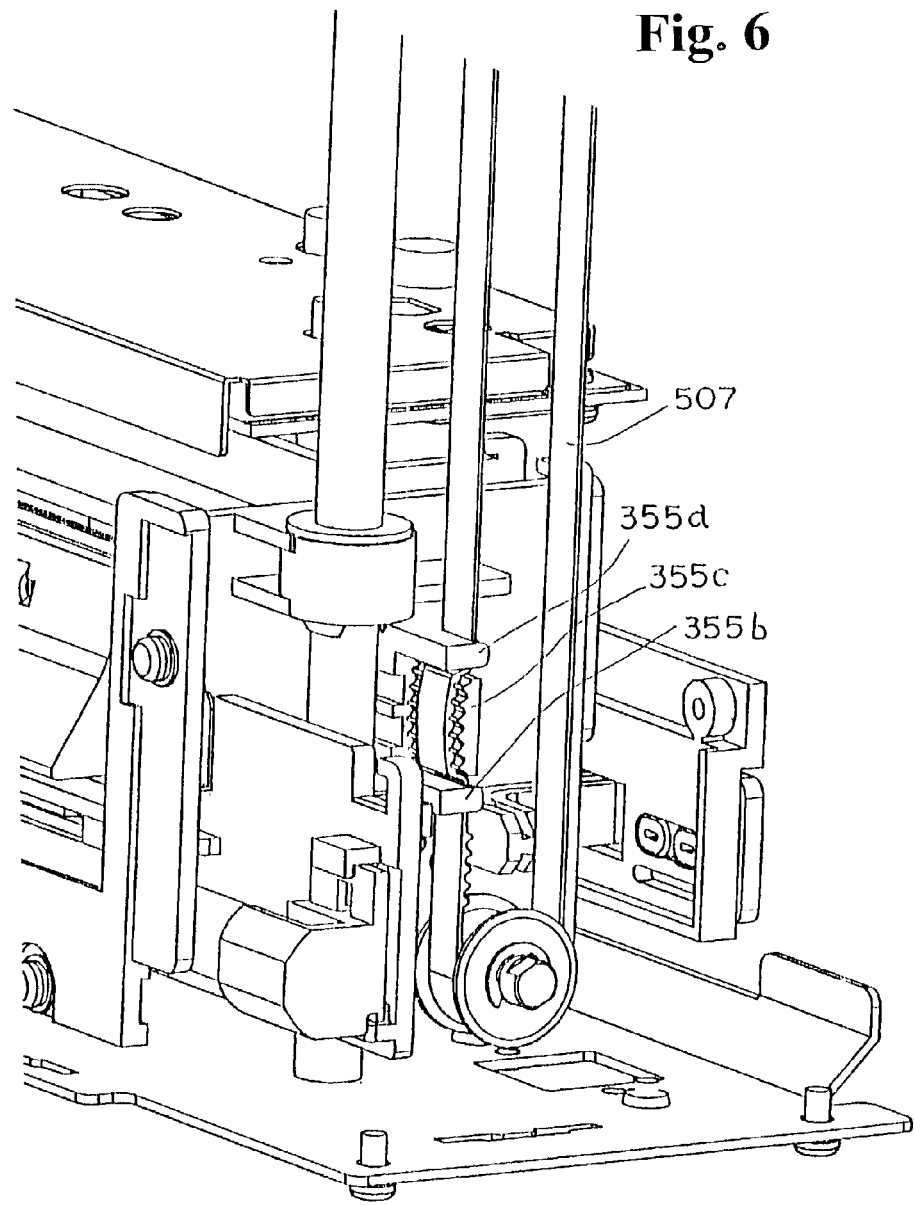
FIG. 6 is a perspective view showing a joint portion of the carriage and a transfer belt of the embodiment of the invention in FIG. 2.

Also, as shown in FIG. 5, on the side surface of the carriage frame 302, cylindrical supporting members 350, 351 integrally formed with the carriage frame 302 are disposed with a space therebetween in a vertical direction, and a guide shaft 333, described later, fits the supporting members 350, 351. Incidentally, cylindrical sliding members 352, 353 are disposed on an inner periphery contacting the guide shaft 333 of the supporting members 350, 351, respectively. Also, a combining member 355 to be combined with a transfer belt 321, described later, is formed between the supporting members 350, 351. As shown in FIG. 6, the combining member 355 is formed of two engaging portions 355a, 355b with a space therebetween, and a tooth portion 355c wherein gear teeth are formed on an R-shape surface to be engaged with the gear teeth of the transfer belt 321.

A cylindrical supporting member is formed integrally with the carriage frame 302 on a side surface opposite to the carriage frame 302, and the supporting member engages the guide shaft 334 to thereby prevent the carriage 301 from moving, and to maintain a predetermined distance between the contact glass 300 and the carriage 301. A sliding member is also disposed on an inner periphery of the supporting member.

The image reading unit 3, as shown in FIGS. 4 and 5, includes plate-like upper and lower frames 331, 332 attached to upper and lower ends of the frame 350. A pair of rod guide shafts 333, 334 parallel to the contact glass 300 and perpendicular to the upper and lower frames 331, 332 is fixed to the frames 331, 332. The guide shafts 333, 334 are disposed in parallel to each other. With the guide shaft 333 engaging the supporting members 350, 351 formed on the side surface of the carriage frame 302, the carriage 301 is supported to be able to slide vertically along the guide shaft 333. The supporting members 350, 351 engage the guide shaft 333 through the sliding members 352, 353. Due to a dimensional deviation between the guide shaft 333 and each of the sliding members 352, 353, when the carriage 301 is moved, wobbling (vibration) may occur. The wobbling becomes larger when the carriage 301 moves downward than upward. Therefore, in the present embodiment, as described later, in order to reduce the influence of the vibration to the image quality, the reading scan of the photograph is carried out while the carriage moves upward. Incidentally, it is of course possible to carry out the reading scan while the carriage is moving downward Next, with reference to FIG. 7, a driving system 310 of the image reading unit 3 will be described.

The driving system 310 is attached to an upper portion of the side surface of the frame 350. The driving system 310 includes a carriage motor M2 rotatable both forward and in reverse for moving the carriage 301; a rotating shaft 313 attached to an upper portion of the carriage motor M2; pulleys 314, 315 disposed to the rotating shaft 313; a rotating shaft 317 (the first rotating shaft) attached to an upper portion of the rotating shaft 313; pulleys 318, 319 attached to the rotating shaft 317; a rotating shaft 321 (the second rotating shaft) attached to a lower portion of the frame 350; and a pulley 320 attached to the rotating shaft 321. The driving system 310 also includes a timing belt 312 extending between a rotating shaft 311 of the carriage motor M2 and the pulley 314; a timing belt 316 extending between the pulley 315 and the pulley 318; and a transfer belt 321' (an endless belt) constituted of a timing belt extended between the pulleys 319 and 320. The carriage 301 is linked via the combining member 355 to a side of the transfer unit 3 of the transfer belt 321' (refer to FIG. 7). The carriage 301 and the transfer belt 321', as shown in FIG. 6, are connected such that a portion of the transfer belt 321' is sandwiched between engaging portions 355a, 355b and the tooth-form portion 355c opposite thereto.

The drive of the carriage motor M2 is transmitted to the rotating shaft 313 through the rotating shaft 311, the timing belt 312 and the pulley 314. The drive transmitted to the rotating shaft 313 is further transmitted to the rotating shaft 317 through the pulley 315, the timing belt 316 and the pulley 318. The transfer belt 321' is rotated by the drive transmitted to the rotating shaft 317 through the pulley 319. Therefore, the transfer belt 321' is rotated in a clockwise direction by the forward drive of the carriage motor M2 to move the carriage 301 upward, and is rotated in a counter-clockwise direction by the reverse drive of the carriage motor M2 to move the carriage 301 downward.

Figure 7:
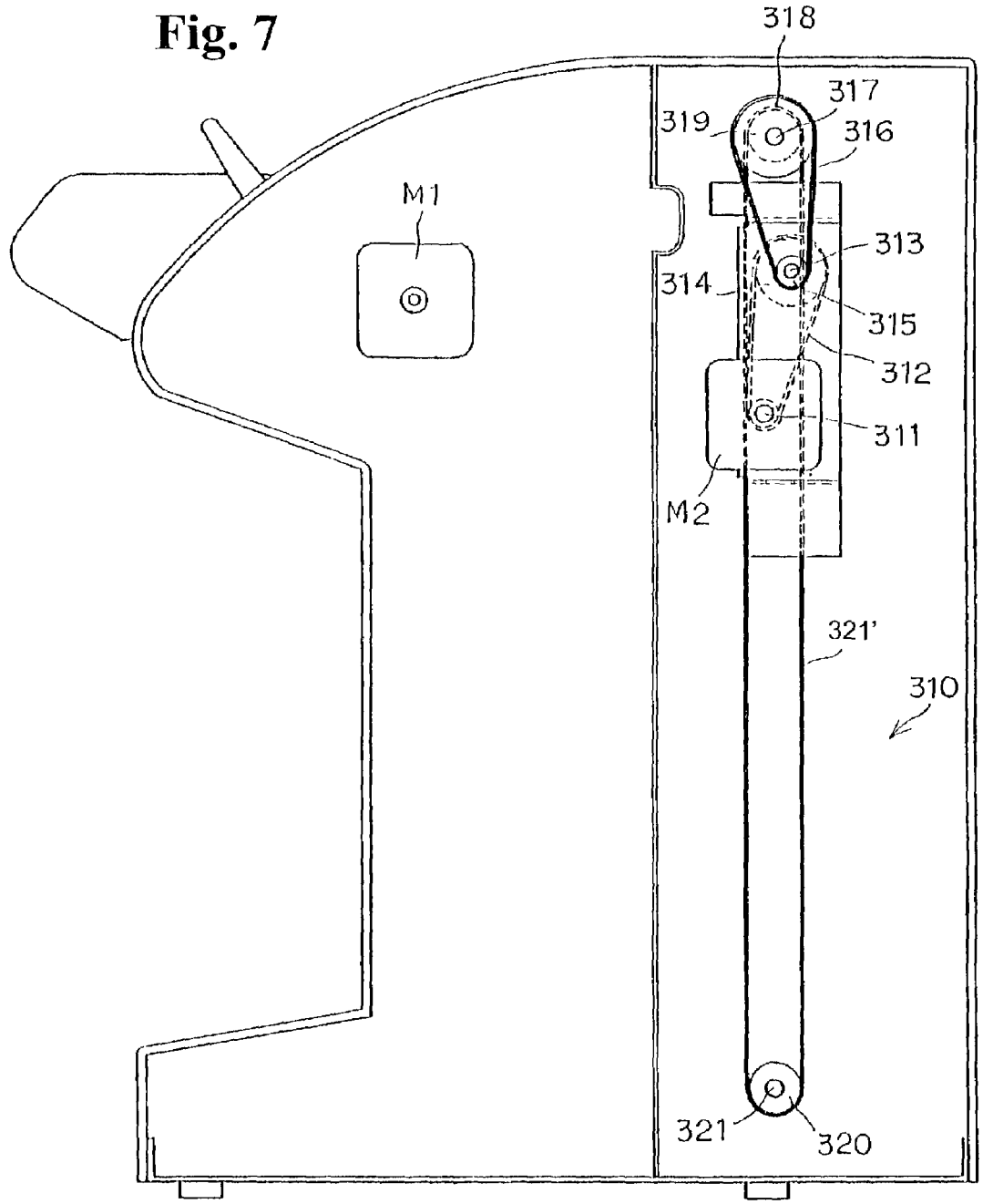
FIG. 7 is a side sectional view showing a driving system of an image reading unit according to the embodiment of the invention in FIG. 2.

Also, as described above, since the transfer belt 321' is rotated through the rotation of the rotating shaft 317, when the transfer belt 321' is rotated in the clockwise direction, tension is applied to a belt on a side of the transfer unit 3 (left side in FIG. 7). When the transfer belt 321' is rotated in the counter-clockwise direction, the tension is applied to a belt on a side opposite to the transfer unit 3 (right side in FIG. 7). Therefore, since the carriage 301 is connected to the left side of the transfer belt 321', the carriage 301 moves in a more stable manner with less vibration when the tension is applied to the left side of the transfer belt 321', i.e. when the transfer belt 321' is rotated in the clockwise direction and the carriage 301 is moved upward. Thus, in the present embodiment, as described later, while moving upward, the carriage 301 reads the photograph so that the vibration has a less influence on the image quality during the carriage 301 moving.

With the structure described above, the carriage 301 moves vertically along the contact glass 300 through the drive of the carriage motor M2. The movement of the carriage 301, as shown in FIG. 3, ranges from a home position H near a lower portion of the white reference plate 323 to a vicinity of the upper end of the contact glass 300.

The home position H is a position where the carriage 301 stays at such an idle time when no power is supplied to the image reading apparatus 1, or the image reading apparatus 1 stands by without performing a reading operation even with the power on. As described above, the carriage 301 has a large weight due to a plurality of parts for reading the photograph, such as a light source 303 and a lens unit 308. Therefore, by holding the carriage 301 at a position lower than the central position M (a substantially central position of the image reading apparatus 1) of the platen glass 300 near a center in a height direction of the image reading apparatus 1 at an idle time, a center of gravity of the entire image reading apparatus 1 is lowered to thereby make it stable. Thus, in the present embodiment, since the lowest position of the operation range of the carriage 301 is set as the home position H, the image reading apparatus can be more stable. Incidentally, a transmission type home position sensor 330 (refer to FIG. 3) is installed at a lower end of the apparatus for detecting the carriage 301 being at the home position H.

Also, as shown in FIG. 3, a terminal reference position T as a standard for stopping the photograph transferred by the transfer unit 2 is set near a lower end of the contact glass 300. When a leading edge of the photograph abuts against a stop device, described later, provided at the terminal reference position T, the photograph stops at a reading position 800 provided in a transfer path 507 formed by the contact glass 300 and the transfer belt 505, described later. The terminal reference position T is also set as a reading start position S of the carriage 301. It is preferable to provide the terminal reference position T at a position closer to a lower end surface of the contact glass 300 to reduce an apparatus size (shortening the contact glass 300). However, with respect to the picture quality, it is preferable that the reading start position S is located properly away from the lower end surface of the contact glass 300 in order to avoid an influence such that a portion of the light from the light source 303 is reflected by the lower end surface of the contact glass 300 so that the light is not irradiated to a predetermined position. Therefore, in the present embodiment, the terminal reference position T and the reading start position S are set at a position about 13 mm away from the lower end surface of the contact glass 300.

As shown in FIG. 3, the transfer unit 2 includes a hand-feed photograph supply portion 10 with a hand-feed photograph supply port 10C formed at an upper end of the contact glass 300; the transfer path 507 connected to the first supply path 109 (described later) for guiding the photograph from the hand-feed supply port 10C to the reading position 800 (the terminal reference position T) along the contact glass 300; a photo-transfer portion 50 integrated to be a unit (a transfer unit 573) for transferring the photograph along the transfer path 507; an automatic photo-supply portion 20 for supplying a photograph shorter than a specific length to the transfer path 507 from a space between the hand-feed supply portion 10 and the photo-transfer portion 50; and a discharge portion 60 for discharging the photograph after the carriage 301 reads the image thereon.

Incidentally, a photograph shorter than the specific length (hereinafter referred to as a "S size photograph") includes, for example, E size (88 mm×117 mm), L size (88 mm×127 mm), 4R size (4 inch×6 inch=101.6 mm×152.4 mm), a high-vision size (88 mm×156 mm), an instant photograph small (86 mm×54 mm), and an instant photograph large (86 mm×108 mm). The photograph longer than the specific length (hereinafter referred to as a "panorama photograph") includes, for example, a panorama photograph (88 mm×254 mm).

The hand-feed supply portion 10 has a cover 101 for opening and closing by rotating around a rotating shaft 102 with a hand; the hand-feed supply port 10C for inserting the panorama photograph; a guide portion 110 for guiding the panorama photograph into the hand-feed supply port 10C; a frame 108 having a hand-feed supply tray 108a for placing (supporting) the panorama photograph, and a guide frame 108b disposed with a predetermined space away from an upper surface of the contact glass 300 for covering a part of the contact glass 300, with an acute angle bent portion in the middle (refer to FIG. 8); the second suction portion 150 integrally formed with the frame 108 for sucking the panorama photograph; and an empty sensor 111 disposed in a vicinity of the upper end of the frame 108 for detecting the panorama photograph.

The cover 101 can be opened or closed by a hand as described above. The cover 101 can prevent a foreign matter, such as dust, from entering the image reading apparatus 1 through the hand-feed supply port 10C at such an idle time when the panorama photograph is not placed on the hand-feed supply tray 108a, or can prevent outer light from entering the image reading apparatus 1 while the image is read.

As shown in FIGS. 3 and 4, a guide portion 110 has a group of the rollers 104, 105, 106, 107 attached to the guide member 103 with a substantially triangular cross section as described above. When the panorama photograph is manually inserted into the hand-feed supply port 10C or the panorama photograph is transferred, the group of the rollers 104, 105, 106, 107 directly contacts the surface of the photograph to thereby reduce a contact resistance between the panorama photograph and the guide member 103 and prevent an image surface of the photograph from being scratched.

Figure 8:
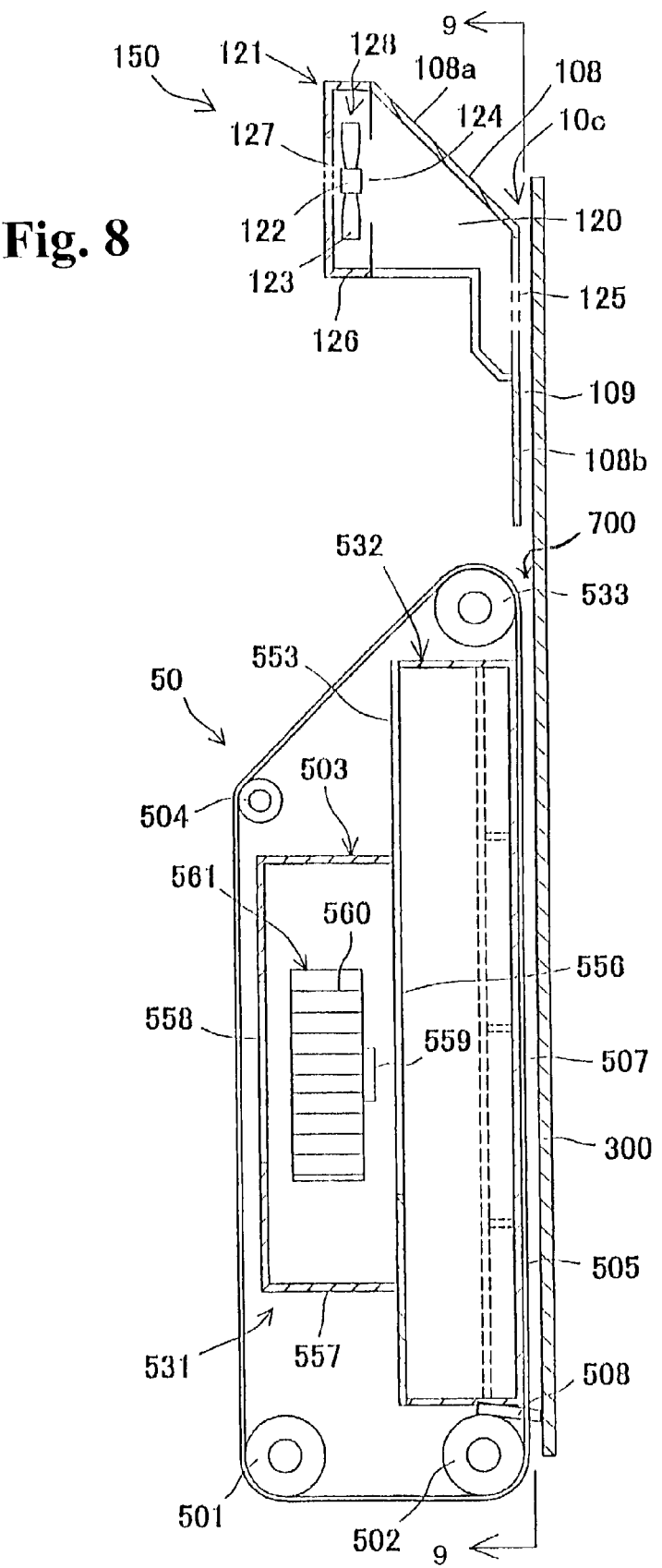
FIG. 8 is a side sectional view showing the first suction portion and the second suction portion according to the embodiment of the invention in FIG. 2.
Figure 9:
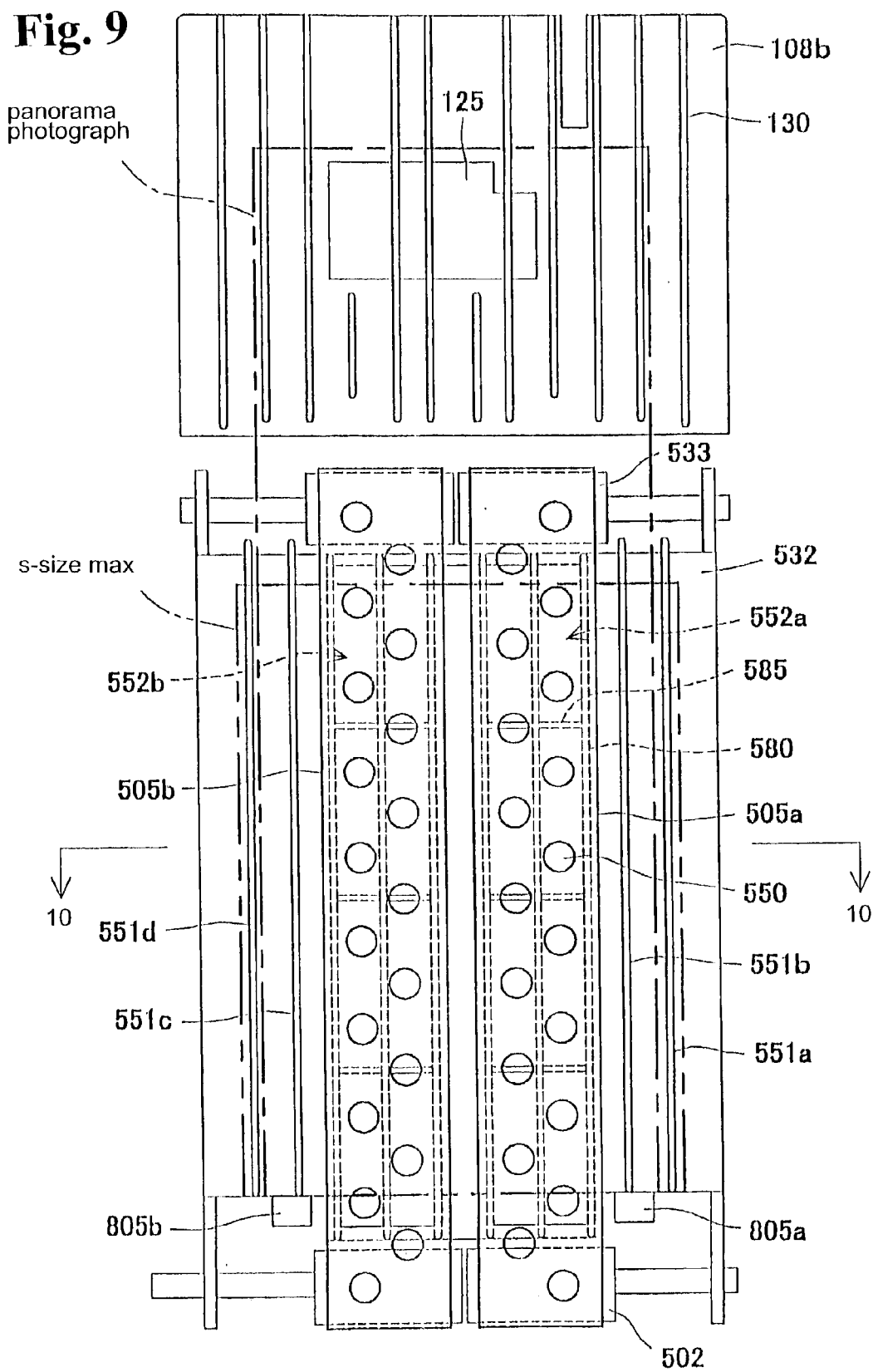
FIG. 9 is a sectional front view showing the first and second suction portions taken along a line 9—9 in FIG. 8.

As shown in FIGS. 3 and 8, the frame 108 has the hand-feed supply tray 108a and the guide frame 108b integrally made of a black color resin. As described above, the hand-feed supply tray 108a located above the bent portion is curved with respect to the first supply path 109 and the transfer path 507 to thereby prevent a foreign matter from directly entering the transfer path 700 from the hand-feed supply port 10C. The guide frame 108b located below the bent portion forms the first supply path 109 together with the surface of the contact glass 300, and, at the same time, functions as a surface for supporting the panorama photograph. As shown in FIG. 9, a plurality of ribs 130 extending in a transfer direction of the panorama photograph is formed on a surface of the guide frame 108b facing the contact glass 300, so that contact resistance of the panorama photograph is reduced through Linear contact with the ribs 103 during the transfer. Also, an inlet 125 in a substantially square shape at a center of the guide frame 108b is formed, and the second suction portion 150 sucks a center portion of the panorama photograph.

As shown in FIG. 8, the second suction portion 150 includes the second suction duct 120 in a bag shape made of a resin integrally with the frame 108, and the second suction fan 121 screwed to a side opposite to the inlet port 125. The second suction fan 121 includes a fan 128 having a plurality of blades 123 around a boss 122 in a box-shape casing 126. The casing 126 has a substantially circular air hole 124 on a side of the second suction duct 120, and a discharge port 127 on a side opposite to the second suction duct 120. Since the air sucked through the inlet port 125 is discharged through the discharge port 127, the panorama photograph is sucked through the inlet port 125 and is held on the ribs 130 of the guide frame 108b. The suction force of the second suction portion 150 is set to be weaker than that of the first suction portion 531, described later.

In the present embodiment, a thickness of the photograph is about 0.3 mm, while a space between a surface of the rib 130 and a surface of the contact glass 300 is set at about 1 mm. Accordingly, a surface of the panorama photograph (an image surface) held by the ribs 130 and sucked by the second suction portion 150 is away from the surface of the contact glass 300 by a predetermined distance (i.e. about 0.7 mm).

Figure 12:
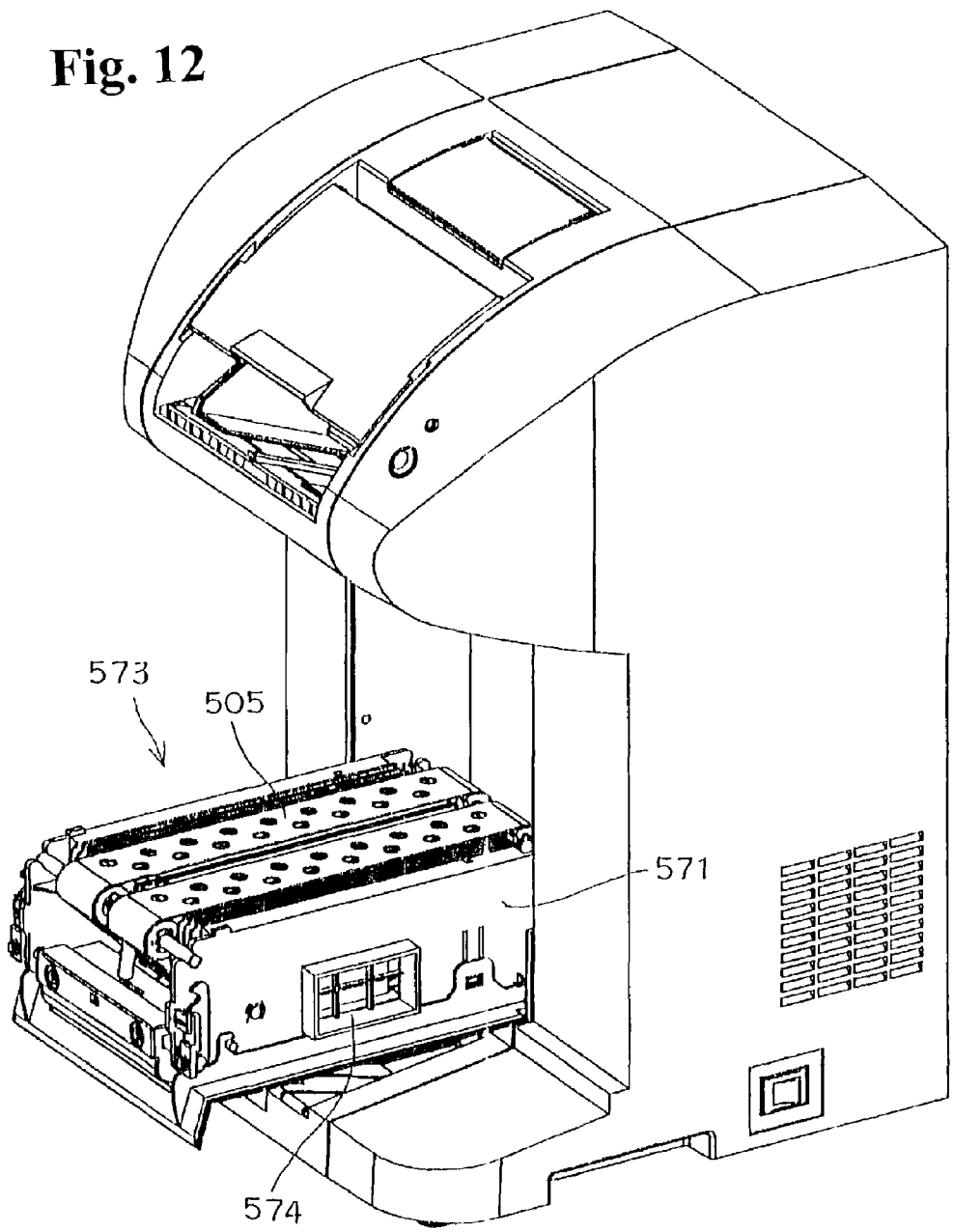
FIG. 12 is a perspective view of an image reading apparatus in a state in which a transfer unit rotates.

The photo-transfer portion 50 has a unit casing 571 made of a black resin with a U-shape cross section as shown in FIG. 12. As shown in FIGS. 3 and 8, disposed inside the unit casing 571 includes rollers 501, 502, 533, 504; an endless belt 505 (transfer belt) extending over these rollers; the first suction portion 531 disposed inside the transfer belt 505 for allowing the photograph sucked to the transfer belt 505; a stop device 508 positioned at a lower portion of the contact glass 300 for moving freely along the transfer path 507 to stop the photograph at the terminal reference position T (the reading position 800); and a stopper drive system 810 including a transfer motor M1 driving the stop device 508. The unit casing thereby constitutes an integral transfer unit 573.

As shown in FIGS. 3 and 8, a space between the transfer belt 505 and the contact glass 300 forms the transfer path 507 extending from the first supply path 109 as described above. As shown in FIG. 9, the transfer belt 505 has a pair of black endless belts 505a, 505b extending in parallel each other in the transfer direction of the photograph. A plurality of inlet ports 550 is provided on the endless belts 505a, 505b in two rows in the transfer direction of the photograph. Incidentally, in order to apply tension to the transfer belt 505, the roller 504 is fixed on one side of a lever 510 having a supporting point at a central portion so as to be rotatable around the supporting point, and a predetermined urging force is applied to the other side of the lever 510 through a spring (refer to FIG. 3).

Figure 11:
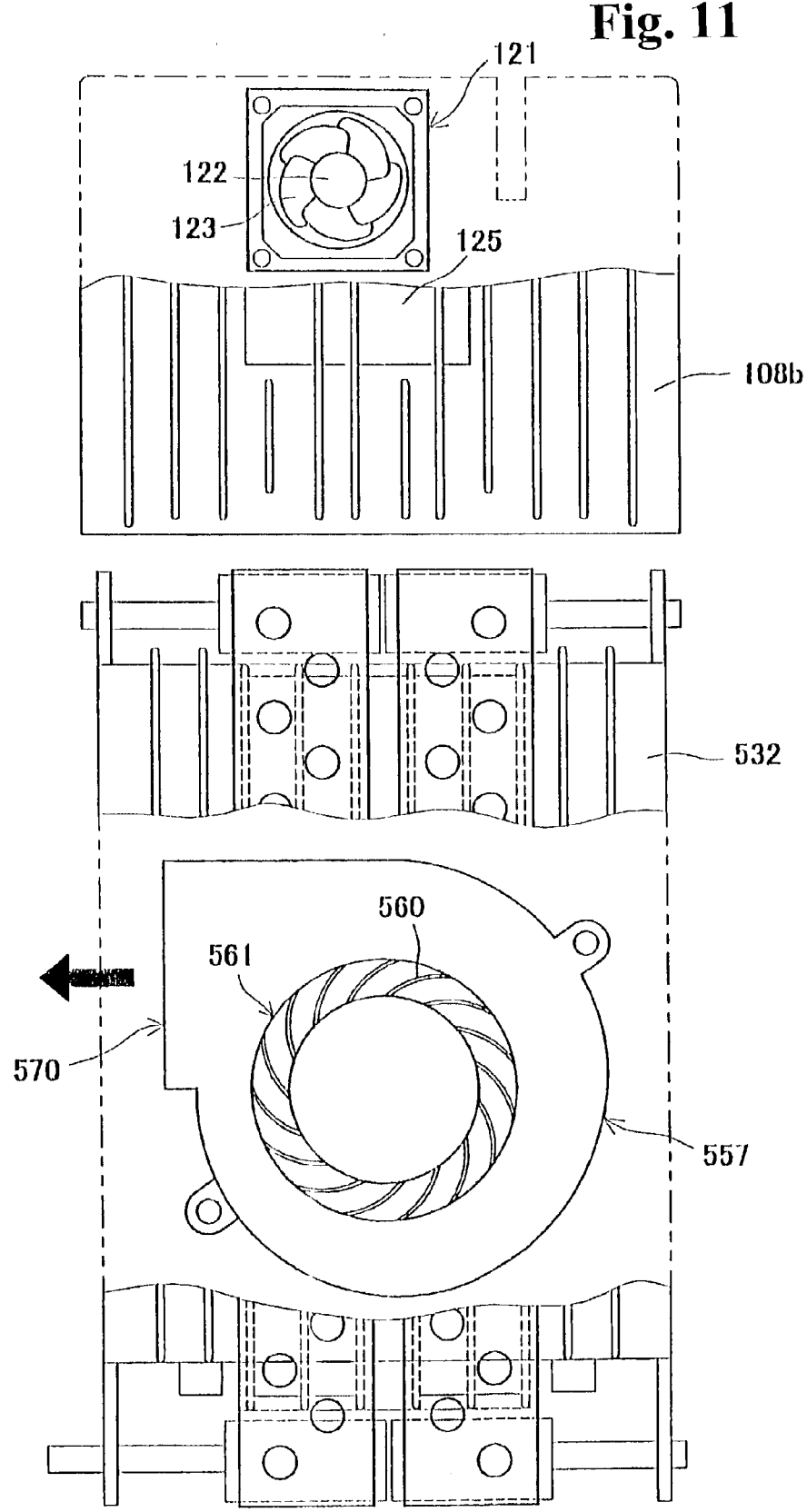
FIG. 11 is a drawing showing a state in which the first suction fan and the second suction fan are installed.

As shown in FIG. 8, the first suction portion 531 includes the first suction duct 532 and the first suction fan 503 having a box-shape made of a black resin and integrally formed with the casing 571. The first suction duct 532 is disposed such that one side facing the contact glass 300 contacts the transfer belt 505 between the rollers 533 and 502 through a beam, described later. An attaching plate 553 provided with a substantially circular air hole 556 at the center thereof is screwed to the other side of the first suction duct 532 with an opening. The first suction fan 503 is fixed to the attaching plate 553 by screws. The first suction fan 503 includes a fan 561 having a plurality of blades 560 around a boss 559 in the box-like casing 557. As shown in FIG. 11, a discharge port 570 for discharging the air sucked in a direction perpendicular to the transfer direction is provided in the casing 557. Further, the air from the discharge port 570 is discharged through the transfer unit 573 from an opening 574 Formed on a side surface of the casing 571.

As shown in FIG. 9, the first suction duct 532 has two longitudinal suction ports 552a, 552b extending in the transfer direction at about the center on a side facing the contact glass 300. The endless belts 505a, 505b are extended over the rollers 533, 502 to cover the suction ports 552a, 552b. As described above, inlet holes 550 are formed in two rows along the suction ports 552a, 552b on the endless belts 505a, 505b, respectively. Therefore, through operation of the first suction fan 503 (rotation of the fan 561) the photograph is sucked to the transfer belt 505 through the inlet holes 550 of the endless belts 505a, 505b and the suction ports 552a, 552b of the first suction duct 503.

The first suction duct 532 has four ribs 551a, 551b, 551c, 551d extending in the transfer direction on both outsides of the suction ports 552a, 552b. These ribs support both sides of the photograph outside of an area supported by the endless belts 505a, 505b disposed at middle, and reduce the contact resistance between the photograph surface and the first suction duct 532 during transfer due to linear contact between the first suction duct 532 and the photograph to thereby prevent the photograph from skewing.

Figure 10:
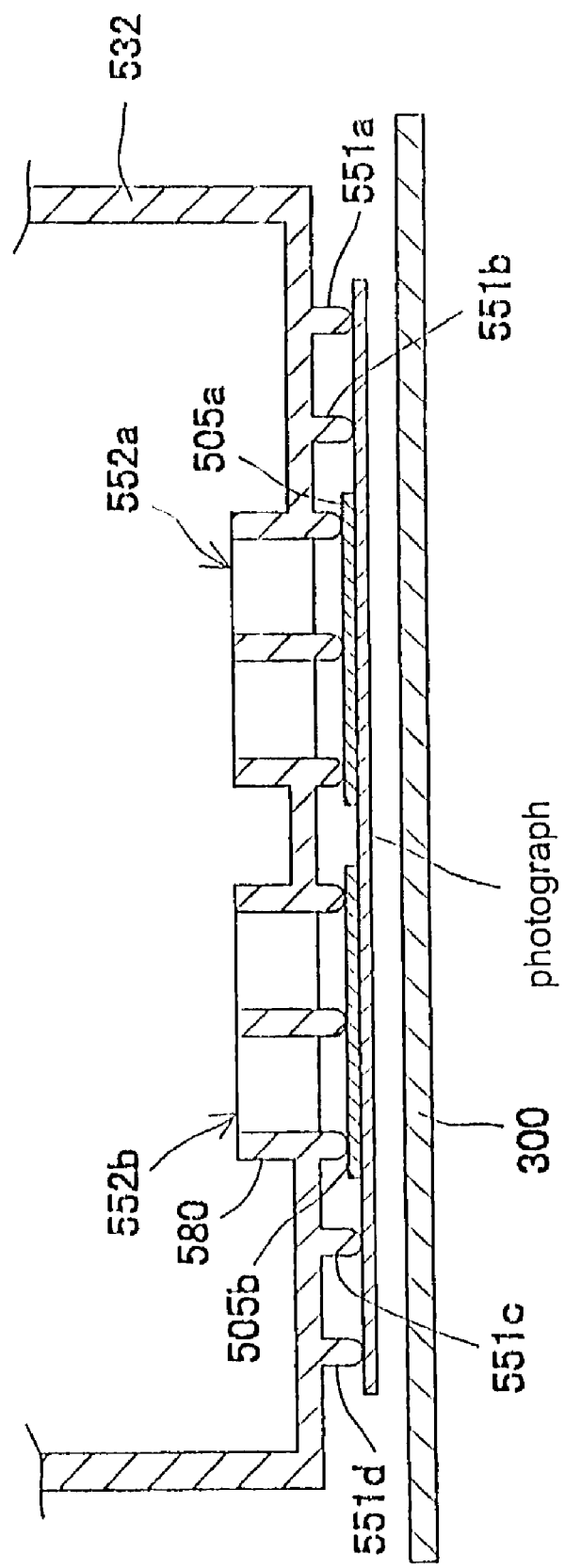
FIG. 10 is a sectional view showing the first suction portion taken along a line 10—10 in FIG. 9.

On the surface of the first suction duct 532 facing the contact glass 300, three vertical beams 580 extending in the transfer direction at both side edges and the center of each of the suction ports 552a, 552b, and three horizontal beams 585 perpendicular to the vertical beams 580 are formed. As shown in FIG. 10, each of the vertical beams 580 and the horizontal beams 585 projects toward the contact glass 300 from the surface of the first suction duct 532 to support the endless belts 505a, 505b. Therefore, the contact area between the surface of the endless belts 505a, 505b and the first suction duct 503 is reduced to thereby minimize the contact resistance. Two of the vertical beams 580 disposed at the center of the suction ports 552a, 552b among six thereof and six of the horizontal beams 585 support the endless belts 505a, 505b to prevent deformation of the belts by suction to thereby prevent the photograph from bending.

As shown in FIG. 10, a height (a length) of the ribs 551a to 551d from the first suction duct 532 is set to be equal to a sum of a height of the vertical beam 580 (the horizontal beam 585) from the first suction duct 532 and a thickness of the endless belts 505a, 505b. Accordingly, the photograph can be flat when sucked by the endless belts 505a, 505b. A distance between the surfaces of the transfer belt 505 and the contact glass 300 as well as a distance between the surfaces of the ribs 551a to 551d and the contact glass 300 are set to be about 1.0 mm as in the hand-feed supply portion 10 described above. Therefore, when the photograph is sucked to the transfer belt 505 by the first suction portion 531 and is supported by the ribs 551a to 551d, a distance between the surfaces of the photograph and the contact glass 300 is a predetermined length (about 0.7 mm). The panorama photograph sucked by both the first suction portion 531 and the second suction portion 150 is also supported and held flat at the predetermined distance from the contact glass 300.

As shown in FIG. 9, a length of the transfer belt 505 between the rollers 533 and 502 is set to be longer than a length of the largest S size photograph (MAX) in the transfer direction and to be shorter than a length of the panorama photograph in the transfer direction. In other words, the first suction duct 532 has an enough length to cover a high vision size photograph with the longest (MAX) length in the transfer direction among the S size photographs when a leading edge of the high vision size photograph abuts against the stop device 508 (stop members 508a, 508b), and to suck a part of a leading edge of the panorama photograph as well. Incidentally, a part of a trailing edge of the panorama photograph is supported by the guide frame 108b of the second suction device 150.

Also, color of the first suction duct 503 (the unit casing 571) and the endless belts 505a, 505b is black to avoid an influence of a background created when the image of the photograph is read. More specifically, since a background color of these members is uniformly black, influences from shadows of the edge portions of the transfer belt and the suction holes can be eliminated. Additionally, when the photograph has a light image (relatively high translucent), a problem where characters or the like on the backside of the photograph can be seen through, i.e. a see-through state, can be prevented. Since the frame 108 is made black as described above, when the panorama photograph is read, it is also possible to eliminate see-through problems caused by an edge portion of the inlet port 125, a lower edge portion of the guide frame 108b, an upper side edge portion of the first suction duct 532 and the like.

Next, the stop device 508 will be explained.

Figure 13:
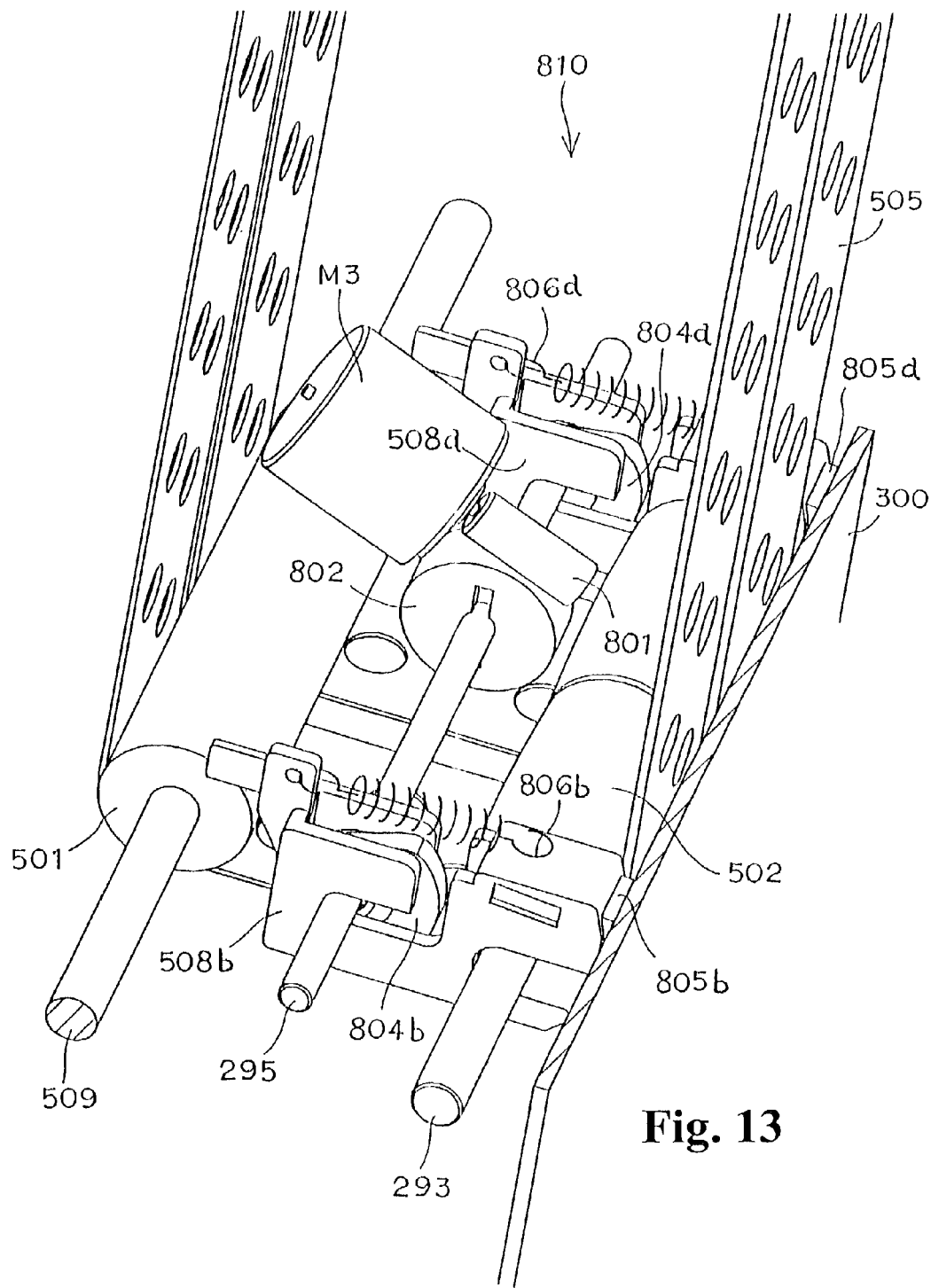
FIG. 13 is a perspective view showing a stop device and its driving system.
Figure 14:
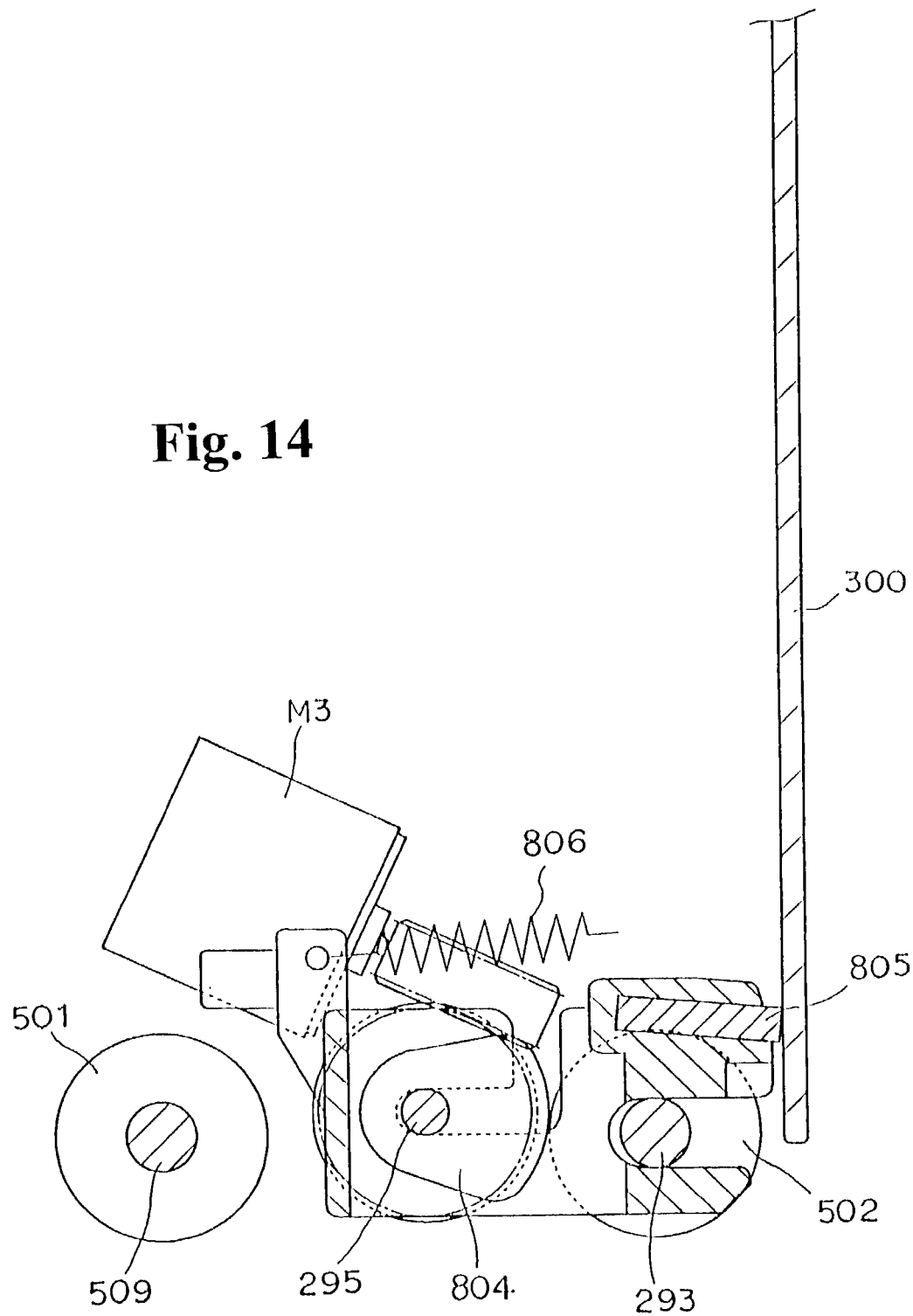
FIG. 14 is a side sectional view showing a stop device and its driving system.

As shown in FIG. 13, the stop device 508 is formed of the stop members 508a, 508b, in the transfer unit 573, and is disposed between the transfer belt 505. The respective stop members 508a, 508b are provided with grooves to be engaged with rotating shafts 295, 293, so that the stop members can slide along the grooves. Also, abutting members 805a, 805b formed of a rubber plate or the like are disposed at an edge of the stop members toward the contact glass 300. The abutting members advance to or retract from the transfer path 507 at the outside of the transfer belt 505. When the stop members 508a, 508b are moved to the closest position to the contact glass 300, the abutting members 805a, 805b contact the contact glass 300, so a leading edge of the photograph abuts and stops at the reading position 800 as the terminal reference position T as described above. Thus, since the respective abutting members 805a, 805b are disposed to advance to or retract at the outside of the transfer belt 505 to thereby abut against outer ends of the photograph, it is possible to correct skewing of the photograph more effectively. The stop members 508a, 508b are urged toward the contact glass 300 by springs 806a, 806b, one end of which is connected to the unit casing 571.

The transfer unit 573 engages a rotating shaft 509 disposed under the transfer unit 573, and the roller 501 with the transfer belt 505 therearound is attached (refer to FIG. 3) to the transfer unit. The transfer unit 573 can be rotated downward around the rotating shaft 509 as a shaft thereof. Therefore, as shown in FIG. 12, by rotating around the rotating shaft 509, the transfer path 507 can be opened with moving the transfer belt 505, so that a paper jam can be easily removed. Further, as shown in FIG. 12, when the transfer path 507 is opened, since the transfer unit 573 stays on the photograph discharge tray 601 (a lower position of the image reading apparatus 1), the apparatus stays in a stable manner. The transfer path 507 can be kept opening without using any other tool, such as a stopper.

As shown in FIG. 3, the automatic photo-supply portion 20 is positioned on an upper side of the transfer portion 50. The automatic photo-supply portion 20 includes a manually operated photo-supply tray cover 200; a photo-supply tray 202 on which a plurality of the S-size photographs can be placed; an insertion port 20C to which each of the S-size photographs on the photo-supply tray 202 can be inserted; guides 204, 205 for guiding the S-size photograph inserted through the insertion port 20C toward a downstream side; a photo-supply portion 21 for supplying the S-size photograph along the second supply path 203 formed by the guides 204, 205; and an empty sensor 206 for detecting the S-size photograph on the photo-supply tray 202.

The photo-supply tray 202 is disposed substantially perpendicular to the contact glass 300 at an upper portion of the transfer belt 505 and projects opposite to the image reading unit 3. The photo-supply tray 202 includes a spring 230 for pressing from a lower side and a rotating shaft 231. The spring 230 urges the photo-supply tray 202 upward with the rotating shaft 231 as a center.

A photo-supply tray cover 200 rotates around a rotating shaft 235 as a pivot, and includes a lever 232 that rotates with engaging the photo-supply tray cover 200. The lever 232 rotates around the rotating shaft 233, and can be engaged with an engaging pin 234 integrally formed with the photo-supply tray 202. When an operator opens the photo-supply tray cover 200, the lever 232 is pressed down. Further, the engaging pin 234 is pressed downward by the lever 232, and the photo-supply tray 202 is lowered so that the S-size photograph can be placed thereon. On the other hand, when the photo-supply tray cover 200 is closed, the lever 232 is raised so that the lever 232 is not engaged with the engaging pin 234 and the photo-supply tray 202 becomes free. At this time, the photo-supply tray 202 is lifted by the spring 230, so that a pick-up roller 250 contacts an uppermost surface of the S-size photograph placed on the photo-supply tray 202, described later.

The second supply path 203 is connected to the first supply path 507 at near the downstream side of the guide frame 108b as well as an automatic photo-supply port X formed between the transfer belt 505 and the guide frame 108b. The second supply path 203 is formed of the guides 204, 205 disposed separately with a predetermined space therebetween. The photo-supply path 203 is curved for guiding the S-size photograph placed on the photo-supply tray 202 from the insertion port 20C to the automatic photo-supply port X. Rollers 210, 211, 212, 213 for guiding the S-size photograph while gradually changing a direction thereof toward the contact glass 300 are disposed near an upper end of the contact glass 300. These rollers 210, 211, 212, 213 overlap each other in outer peripheries of the adjacent rollers to be in a zigzag pattern. Therefore, a surface of the S-size photograph is less damaged or stained. On a position opposite to the driven rollers, a timing sensor 207 is disposed for detecting a leading edge and a trailing edge of the S-size photograph through its on and off operations.

The photo-supply portion 21 includes a pick-up roller 250W for picking up the S-size photograph on the photo-supply tray 202; a photo-supply roller 251W for transferring the S-size photograph toward a downstream side; a separating roller 252W for separating the S-size photographs together with the photo-supply roller 251W one by one; register rollers 253, 254 for correcting an inclination (skew) of the S-size photograph and transferring it toward the downstream side; and a guide roller 255 for reducing contact resistance between the S-size photograph and the guide 205. These rollers are disposed along the guides 204 and 205. The S-size photograph placed on the photo-supply tray 202 is inserted into the transfer path 507 through the photo-supply path 203 and the automatic photo-supply port X by the transfer motor M1, described later.

A discharge portion 60 is positioned under the transfer portion 50. The discharge portion 60 includes an discharge tray 601 disposed under the transfer belt 505 for receiving the photograph thereon after reading the image on the photograph by the carriage 301; a rotor supporting member 615 disposed under the contact glass 300 as described above; a photo-discharge portion 61 disposed at a downstream side of the rotor supporting member 615 for guiding the photograph along a photo-discharge path 604 toward the photo-discharge tray 601; and a photo-discharge sensor 613 for detecting a trailing edge of the photograph.

Incidentally, similar to the photo-supply tray 202, the photo-discharge tray 601 is positioned on one side of the image reading apparatus 1 (a side opposite to the image reading unit 3) and is substantially perpendicular to the contact glass 300. Therefore, the photograph can be set and taken out from the same side to thereby improve its operation ability. Further, since the photo-supply tray 202 and the photo-discharge tray 601 are substantially perpendicular to the contact glass 300 (substantially parallel to the installation surface of the image reading apparatus 1), even if the image reading apparatus 1 is installed on an elevated place, such as a shelf, the photograph can be easily set and taken out.

The photo-discharge portion 61 includes a curved guide 603 forming one side of the photo-discharge path 604; rollers 605, 606, 607 disposed along the guide 603; and a photo-discharge belt 612 forming the other side of the photo-discharge path 604, and having a curved shape through being pulled by the pulleys 608, 609, 610, and pushed by the rollers 605, 606, 607. A photo-discharge sensor 613 facing the photo-discharge path 604 is disposed between the driven rollers 606 and 607. Also, as described above, under the contact glass 300, a plurality of the rollers 602 (the driven rotors) is disposed in a zigzag pattern wherein outer peripheries of the adjacent rollers continuously overlap each other in a photo-transfer (photo-discharging) direction in order to avert the photograph. As described above, since a plurality of the rollers 602, which rotates along with the transferred photograph, are provided on a side of the curved photo-discharge path for contacting the photograph surface (an image surface), it is possible to reduce a scratch or a stain on the photograph surface.

Figure 15:
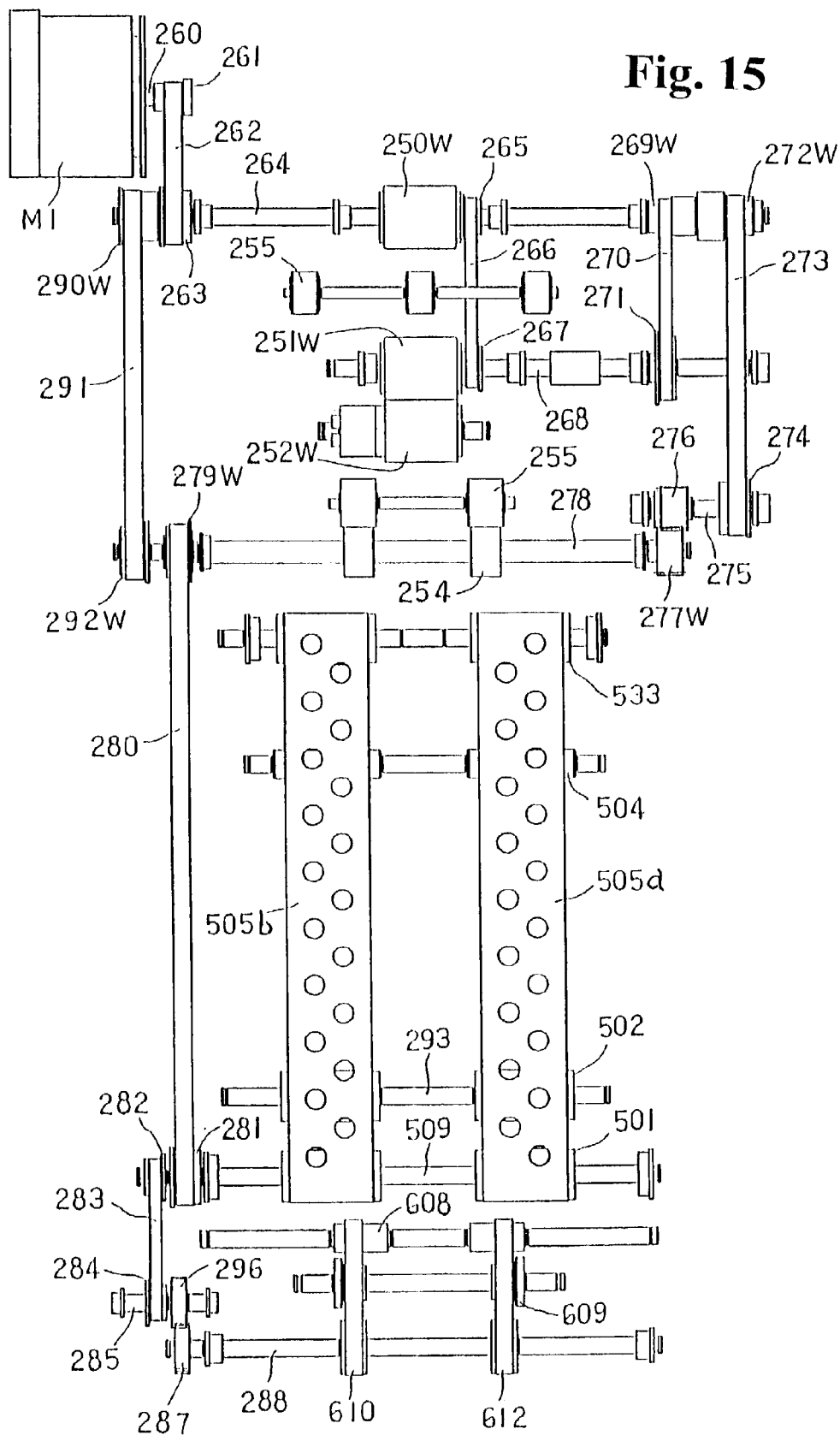
FIG. 15 is a drawing showing a driving system of a transfer unit.

Next, with reference to FIG. 15, a driving system of the photo-transfer unit 2 will be explained.

The photo-transfer unit 2 has the transfer motor M1 rotatable both forward and in reverse (refer to FIG. 7).

The forward drive of the transfer motor M1 is transmitted to a rotating shaft 264 through a rotating shaft 260, a pulley 261, a timing belt 262 and a pulley 263 to rotate a pick-up roller 250W (with a one-way clutch) attached to the rotating shaft 264 in the transfer direction. A pulley 290W (with the one-way clutch) does not receive the drive due to the one-way clutch. Further, the drive transmitted to the rotating shaft 264 is transmitted to a rotating shaft 268 through a pulley 265, a timing belt 266 and a pulley 267 to rotate a photo-supply roller 251W (with the one-way clutch) attached to the rotating shaft 268 in the transfer direction along with a separation roller 252W. Further, the drive transmitted to the rotating shaft 264 is transmitted to a rotating shaft 278 through a pulley 272W (with the one-way clutch), a timing belt 273, a pulley 274, a rotating shaft 275, gears 276, 277W to rotate a register roller 254 formed of two rollers attached to the rotating shaft 278 in the transfer direction. Incidentally, the forward drive thereof is not transmitted to the pulleys 279W, 292W provided to the rotating shaft 278 due to the one-way clutch.

When the transfer motor M1 rotates in reverse, in the same manner as in the forward drive, the drive is transmitted to the rotating shaft 264 through the rotating shaft 260, the pulley 261, the timing belt 262 and the pulley 263. Further, the drive transmitted to the rotating shaft 264 is transmitted to the rotating shaft 278 through the pulley 290W, a timing belt 291 and the pulley 292W to rotate the register roller 254 formed of two rollers and provided to the rotating shaft 278 in the transfer direction. Therefore, the register roller 254 rotates in the same direction in both forward and reverse drives of the transfer motor M1. Incidentally, the reverse drive transmitted to the rotation shaft 278 is not transmitted to the gear 277W by the action of the one-way clutch. Further, the drive transmitted to the rotating shaft 278 is transmitted to a rotating shaft 509 through the pulley 279W (with one-way clutch), a timing belt 280 and a pulley 281 to rotate two rollers 501 attached to the rotating shaft 509. Accordingly, a transfer belt 505 (505a, 505b) extended over the rollers 501, 502, 504 and 533 rotates in the transfer direction. Further, the drive transmitted to the rotating shaft 509 is transmitted to a rotating shaft 288 through a pulley 282, a timing belt 283, a pulley 284, a rotating shaft 285, gears 296, 287 to rotate a roller 610 attached to the rotating shaft 288. Accordingly, a photo-discharge belt 612 extended over the pulleys 608, 609 and 610 rotates in the transfer direction.

As described above, the pick-up roller 250, the transfer roller 251W (the separation roller 252) and the register roller 254 (register roller 253) rotate in the transfer direction through the forward drive of the transfer motor M1. The register roller 254 (the register roller 253), the transfer belt 505 and the discharge belt 612 rotate in the transfer direction through the reverse drive of the carriage motor M2.

Incidentally, the pulley 281, the rotating shaft 509, the roller 501, the rotating shaft 293, the rollers 502, 504, a rotating shaft to which the roller 504 is fixed, the roller 533, a rotating shaft to which the roller 533 is fixed, and the transfer belt 505 are housed in the transfer unit 573 for transmitting the drive to the transfer belt 505.

Next, a stopper drive system 810 as a drive system of the stop device 508 will be explained.

As shown in FIG. 13, a stopper motor M3 for driving the stop device 508 is disposed between the transfer belts 505 in the transfer unit 573. The drive of the stopper motor M3 is transmitted to the rotating shaft 295 through a worm gear 801 and a gear 802 attached to the rotating shaft 295. Further, cams 804a, 804b attached to the rotating shaft 295 rotate to thereby engage stop members 508a and 508b, respectively, so that the respective cams 804a, 804b slide along grooves to allow the respective abutting members 805a, 805b to advance into or retreat from the transfer path 507.

The photograph reading apparatus 1, as shown in FIG. 16, is provided with a control board 400. The control board 400 includes a CPU 401; a line correction SRAM 402; a hading correction SRAM 403; a gamma correction SRAM 404; a transmission buffer SDRAM 405; an image data process IC 406; a forwarding data process IC 407; a ROM 408; a SRAM 409; an EEPROM 410; a motor driver 411 for driving motors; a SCSI-2 interface 412 to which a control device 430 is connected; and an IEEE 1394 interface 413. The control board 400 is connected to an AC power source. Further, a fan driver 860 for controlling a switching operation of the first suction fan 503 and the second suction fan 121 is provided to the control board 400.

The CPU 401 executes a program stored in the ROM 408, and drives the transfer motor M1, the carriage motor M2 and the like after receiving information from various detecting sensors to thereby transfer and read the photograph.

The line space correction SRAM 402 is correcting spaces between the three lines RGB picture element rows. In output data from an image sensor 309, wherein the RGB picture element rows are constituted with a predetermined distance therebetween, assuming data in the first picture element row is the N-th line at a certain time t0, the second picture element row is the (N–n)-th line, and the third picture element row is the (N–2n)-th line. The line space correction is for temporarily storing previous data and outputting the same line data at the same timing, and is constituted of a memory element for storing the previous data.

The shading correction SRAM 403 is a memory element for storing black and white standards of all picture elements of the RGB colors required for the correction when the shading correction is performed in order to remove influences of optical system variations and sensitivity irregularities of the image sensor 309.

It is necessary to perform the gamma correction to the image input data in order to correct a linearity of the color gradation of the obtained image data or to obtain a desired output. The gamma correction SRAM 404 is a memory element for storing a look-up table to convert to any desired data by using the look-up table for the each color data from 0 to 4095.

The transfer buffer SDRAM 405 temporarily stores data to be transferred to the control device 430. The final data is transferred to the control device 430 through a SCSI-2 interface 412. When a data transfer time is longer than a data reading time, it is required to interrupt the reading. Therefore, the SDRAM 405 is a memory element for temporarily holding the output data so that the data reading can be done, even during the data transfer without interrupting the reading.

The image data process IC 406 (a gate array) is an element specific for conducting the color correction to remove influences of the above-stated various corrections, the optical system, the image sensor 309 and the like.

The transfer data process IC 407 (a gate array) is an element specific for converting the processed data to a format suitable for transfer, and for controlling the transmission buffer SDRAM 405.

The ROM 408 stores a program for controlling the entire apparatus.

The SRAM 409 is a memory element for temporary storing an operation data for the CPU 401.

The EEPROM 410 is a memory element for storing an adjusting value and the like for the optical sensor.

Figure 1:
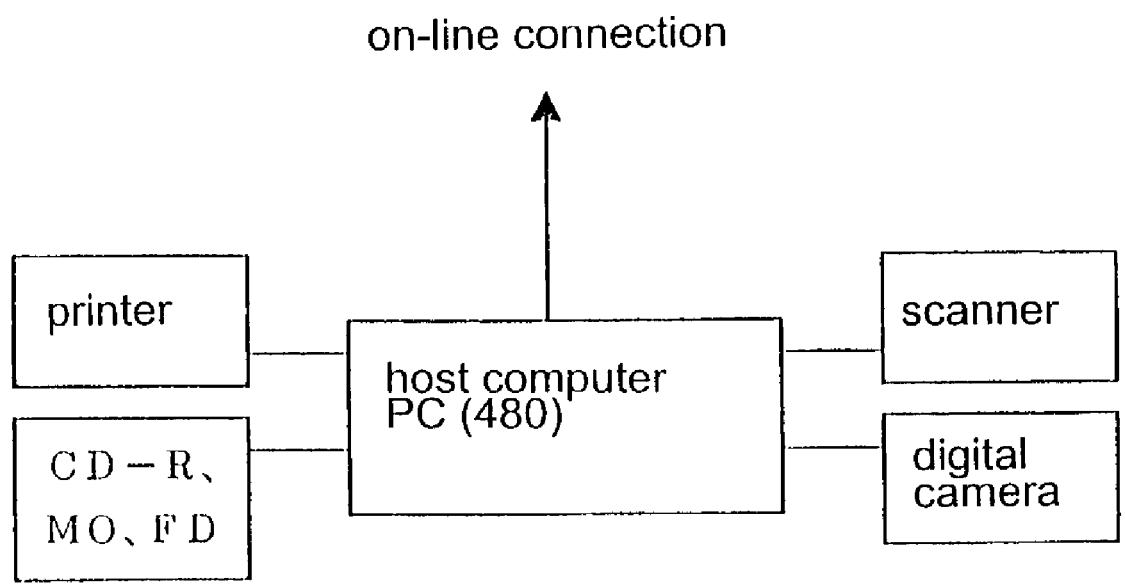
FIG. 1 is a block diagram showing a system to which an image reading apparatus is applied.

The control device 430 is a host computer PC as shown in FIG. 1, and carries out a command for setting a photograph type, starting reading the image and processing the same. Also, with the host computer PC, it is possible to select an automatic photo-supply mode wherein single or a plurality of S-size photographs is automatically transferred to the image reading unit 3 to read, or a panorama mode wherein a panorama photograph is manually transferred to the image reading unit 3 to read. Through the mode selection, the control device 430 can execute one of the reading modes.

In the panorama mode, since a large quantity of the image data is processed, a reading resolution is lower than that of the automatic photo-supply mode. For example, the photograph is read at a resolution of 600DPI in the automatic photo-supply mode, while the photograph is read at a resolution of 300DPI in the panorama mode.

Figure 17:
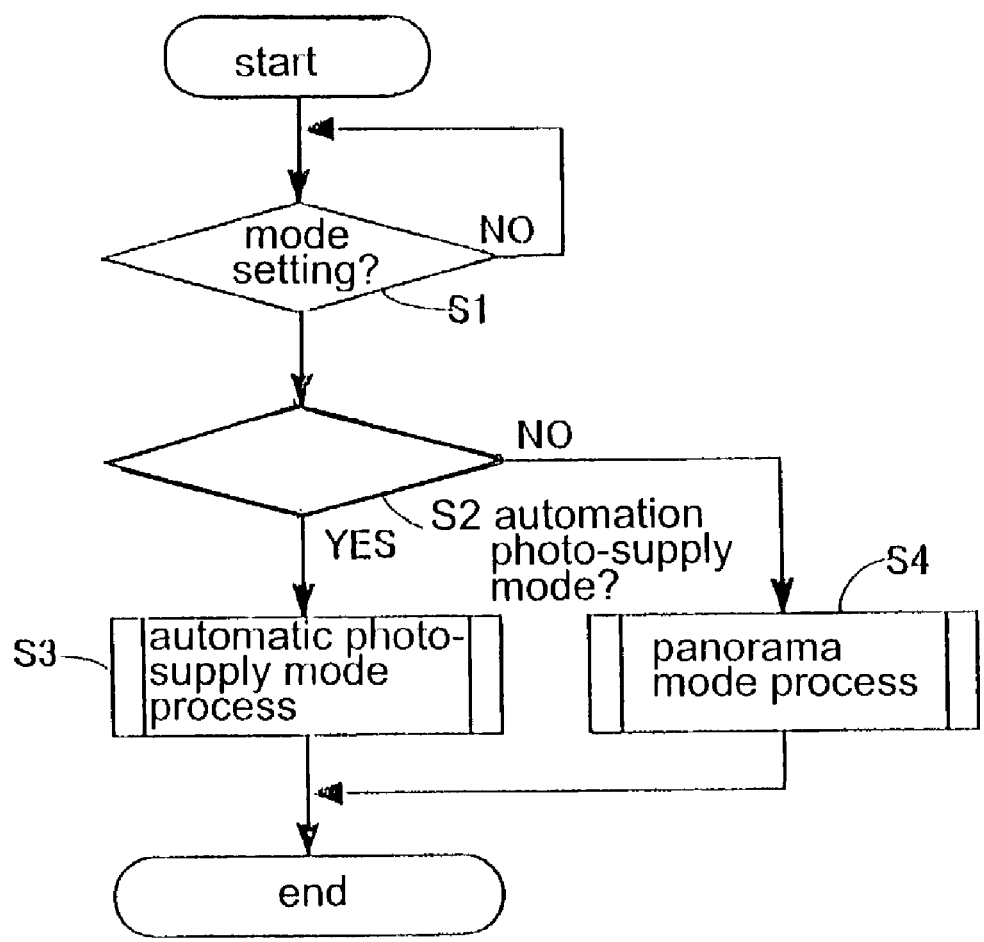
FIG. 17 is a flow chart showing an image reading routine carried out by CPU of a control portion.
Figure 18:
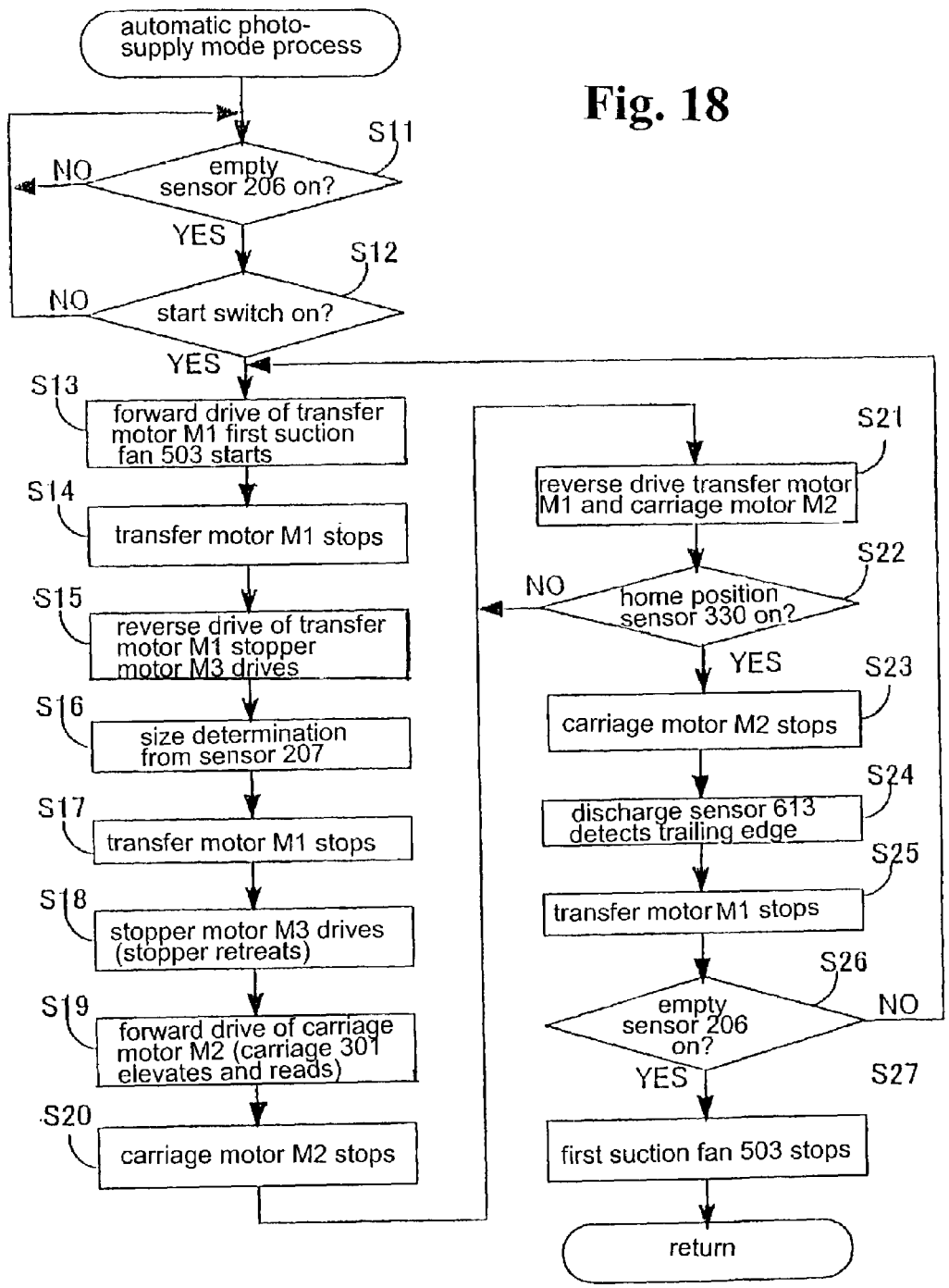
FIG. 18 is a flow chart showing an automatic document supply mode process sub-routine of the image reading routine in FIG. 17.
Figure 20:
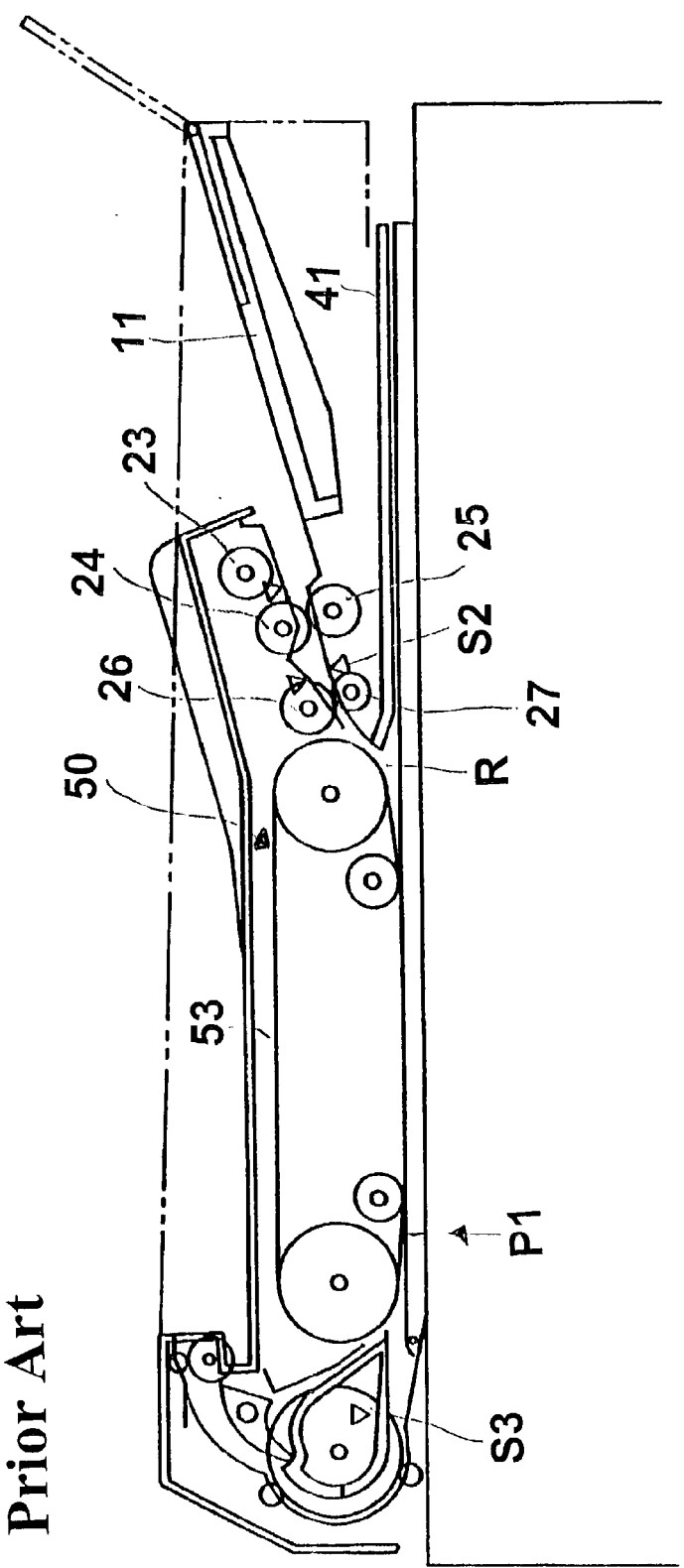
FIG. 20 is a sectional view showing a conventional document transfer device.
Figure 21:
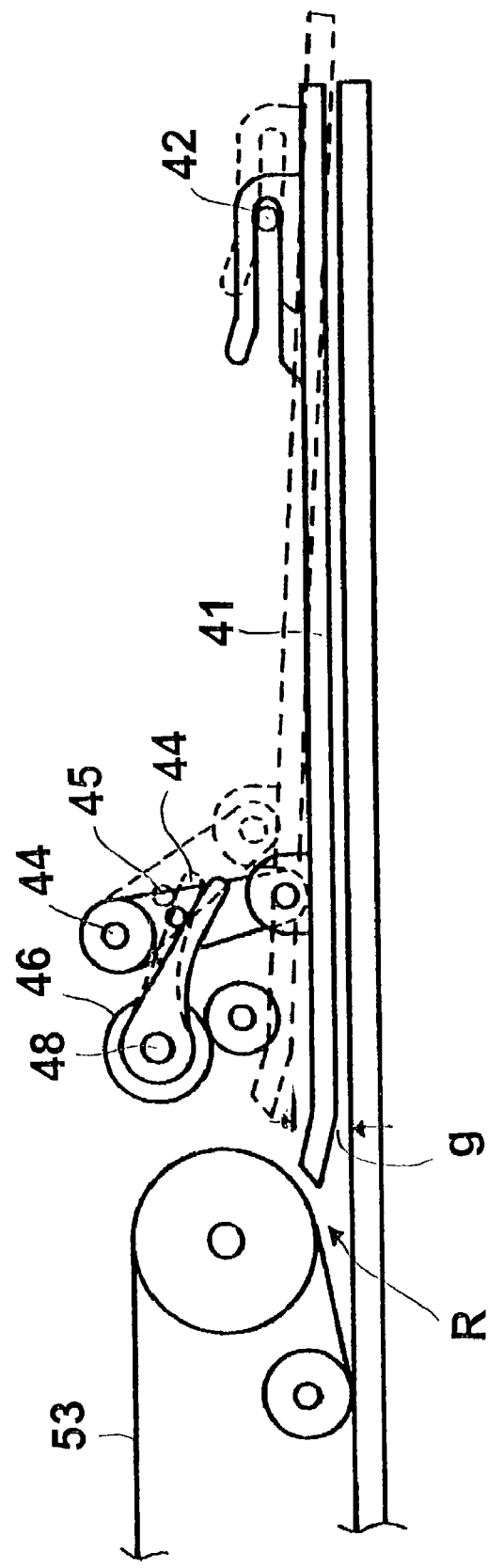
FIG. 21 is a partial sectional view of the conventional document transfer apparatus in FIG. 20.

Next, with reference to flow charts as shown in FIGS. 17, 18 and 19, an operation of the image reading apparatus 1, mainly relating to CPU in the control portion, according to the present embodiment will be explained. When the image reading apparatus 1 is turned on, an image reading routine for reading the image of the photograph is performed.

As shown in FIG. 17, in the image reading routine, the apparatus first stands by until an operator selects a mode through the host computer PC at Step S1. The operator can select either the automatic photo-supply mode or the panorama mode as described above.

At the next Step S2, it is determined whether the automatic photo-supply mode is selected or not. If it is the case, an automatic photo-supply mode process sub-routine is executed at Step S3.

As shown in FIG. 18, in the automatic photo-supply mode process sub-routine, the apparatus stands by until the empty sensor 206 detects an S-size photograph at Step S11. When the output is yes, i.e. when the operator places the S-size photograph on the supply tray 202 with a reading surface of the photograph upward at a center standard and closes the photo-supply tray cover 200, the engagement between a lever 232 and an engaging pin 234 is released. The supply tray 202 is elevated while rotating around the rotating shaft 231, and a surface of the uppermost photograph is pressed against the pick-up roller 250. When the empty sensor 206 detects the S-size photograph, the operator selects a start button on the host computer PC at the Step S12, and it is determined whether a supply signal is sent. If the supply signal is not sent, the routine is returned to Step S11. If the supply signal is sent, the transfer motor M1 rotates forward at Step S13 and, at the same time, the first suction fan 503 starts.

The pick-up roller 250 rotates in the transfer direction (the counter-clockwise direction in FIG. 3), and the uppermost S-size photograph is sent out from the insertion port 20C to the second supply path 203. Further, after the S-size photograph is separated into a single photograph by the photo-supply roller 251W and the separation roller 252W rotating in the transfer direction (the counter-clockwise direction in FIG. 3), it is transferred toward the downstream side by the resister rollers 253, 254 along the photo-supply path 203. Also, the first suction fan 503 starts suction in the first suction duct 502.

At Step S14, it is determined whether the timing sensor 207 detects a leading edge of the photograph. In the case of no detection, the transfer motor M1 continues to rotate, and in the case of detection, the transfer motor M1 stops to rotate. At this time, the S-size photograph stays in a state where the leading edge thereof is detected by the timing sensor 207.

Next, at Step S15, the transfer motor M1 rotates in reverse to rotate the transfer belt 505 in the transfer direction (the clockwise direction in FIG. 3), and, at the same time, the stopper motor M3 is driven thus allowing the stop members 508*a*, 508*b* to move and the abutting members 805*a*, 805*b* to advance into the transfer path 507. The S-size photograph is transferred from the automatic photo-supply port X to the transfer path 507 through rotation of the resister rollers 253, 254. The photograph is directed toward the transfer belt 505, while the transfer direction is corrected when the leading edge of the photograph abuts against the contact glass 300. The photograph at the transfer belt 505 is transferred to the terminal reference position T by the rotation thereof while being sucked by the first suction fan 503 on the transfer belt 505.

At the Step S16, a size of the S-size photograph is determined from the leading and rear edges of the S-size photograph detected by the timing sensor 207. At Step S17, after the timing sensor 207 detects the leading edge of the S-size photograph, it is determined whether the photograph is transferred by a predetermined distance or not. If the output is no, the transfer is continued, and in the case of yes, the transfer motor M1 stops. Accordingly, the transfer belt 505 stops to rotate, the leading end of the S-size photograph abuts against the abutting members 805*a*, 805*b*, and the photograph is held along the contact glass 300 at the reading position 800 at the terminal reference position T as the standard. At this time, the S-size photograph is sucked on the transfer belt 505 at the substantially central portion thereof in the transfer direction, so that the photograph is held with a predetermined space apart from the contact glass 300, as described above.

Next, at step S18, the stopper motor M3 rotates in reverse to move the stop members 508*a*, 508*b* and retreat the respective abutting members 805*a*, 805*b* from the transfer path 507. At Step S19, the carriage motor M2 rotates forward. Thus, the transfer belt 321 rotates in the clockwise direction in FIG. 3, and the carriage 301 is elevated from the home position H. The carriage 301 reads the white reference plate 323 for correcting the shading while moving upward, and then reads the image while moving upward over a distance corresponding to the length of the S-size photograph from the reading-start position S.

At Step S20, it is determined whether the carriage 301 is elevated by a distance corresponding to the length of the S-size photograph determined at Step S16 or not. If the output is no, the process at Step S19 continues, and in the case of yes (completion of reading), the carriage motor M2 stops the forward rotation.

At Step S21, the carriage motor M2 and the transfer motor M1 rotate in reverse. The transfer belt 321 rotates in the counter-clockwise direction in FIG. 3 through the reverse rotation of the carriage motor M2, and the carriage 301 starts lowering toward the home position H. Next, at Step S22, it is determined whether the carriage 301 is detected by the home position sensor 330 or not, and if the output is no, the operation is returned to Step S21 to continue the reverse rotation of the carriage motor M2 and transfer motor M1. In the case of yes, at the next Step S23, the carriage motor M2 stops. The reverse drive of the transfer motor M1 is continued, the transfer belt 505 and the discharge belt 612 rotate in the clockwise and counter-clockwise direction, respectively. The S-size photograph is transferred toward the discharge tray 601. Also, at Step S23, it is determined whether the leading end of the S-size photograph is detected or not by the photo-discharge sensor 613. If the output is no, the reverse drive of the transfer motor M1 is continued, and in the case of yes, the rotation speed of the transfer motor M1 is reduced.

Next, at Step S24, it is determined whether the trailing edge of the S-size photograph is detected or not. If the output is no, the reduced rotation speed of the transfer motor M1 is maintained, and in the case of yes, at the next Step S25, after the reverse rotation is continued by a predetermined feeding distance, the transfer motor M1 stops. Thus, the S-size photograph is placed on the discharge tray 601. Next, at Step S26, the empty sensor 206 determines whether the next S-size photograph is detected or not, and in the case of yes, the operation is returned to Step S13 to process the next S-size photograph, while in the case of no, the first suction fan 503 stops at Step S27, thus completing the automatic photo-supply mode process sub-routine and the image reading routine. Incidentally, after the image data on the photograph is processed for the corrections such as the line space correction and the like, it is sequentially transferred to the host computer PC.

On the other hand, in the case that the output is no at Step S2 shown in FIG. 17, a panorama mode process sub-routine as shown in FIG. 19 is executed at Step S4. In the panorama mode, the operator opens the cover 101 and manually inserts a panorama photograph until a leading edge thereof reaches a space between the transfer belt 505 and the contact glass 300 (for example, the center of the transfer belt 505) through the hand-feed supply port 10C and the first supply path 109. Thus, a trailing edge of the panorama photograph is placed on the hand-feed supply tray 108*a*. Incidentally, in FIG. 19, the same symbols for the same steps as those in FIG. 18 are assigned and explanations thereof are omitted. Only different steps and portions will be explained.

In the panorama process sub-routine at Step S31, the apparatus first stands by until the empty sensor 111 detects the panorama photograph. Once the empty sensor 111 detects the panorama photograph, at the next Step S32, the first suction fan 503 and the second suction fan 121 start. Therefore, the first suction duct 532 and the second suction duct 120 start sucking, respectively. The transfer belt 505 pulls the leading edge side of the panorama photograph, and the inlet port 125 formed at the guide frame 108*b* pulls the trailing edge side thereof.

Next, at Step S33, when the operator selects a start button on the PC and a photo-supply signal is confirmed, at the next Step S34, the transfer motor M1 rotates in reverse after a predetermined time and, at the same time, the stopper motor 3 is driven. Thus, the transfer belt 505 rotates in the clockwise direction in FIG. 3 to thereby allow the abutting members 805*a*, 805*b* to advance into the transfer path 507. Then, the trailing edge side of the panorama photograph is sucked through the second suction fan 121 and separated by the predetermined distance from the contact glass 300 as described above. While the first suction fan 503 is pulling the leading edge side of the panorama photograph, the panorama photograph is transferred toward the downstream side through rotation of the transfer belt 505.

Next, at Step S35, it is determined whether the trailing edge of the panorama photograph is detected or not by the empty sensor 111. In the case that the output is no, the transfer motor M1 continues to rotate, while in the case of yes, the panorama photograph is further transferred by a predetermined distance (a distance required for the leading edge of the panorama photograph to abut against the abutting members 805*a*, 805*b*), and thereafter, the transfer motor M1 stops. At this time, the leading edge of the panorama photograph abuts against the abutting members 805a, 805b to thereby stop at the reading position 800 with the terminal reference position T as standard. The leading edge of the panorama photograph is sucked to the transfer belt 505 by the first suction fan 503, and the trailing edge thereof is sucked through the inlet port 125 of the guide frame 108b by the second suction fan 121. Thus, the transfer belt 505 and the suction port 125 hold the panorama photograph with the predetermined distance away from the contact glass 300 as described above.

At the next Steps S18 to S24, as described above, the same processes as steps corresponding to the automatic photo-supply mode process sub-routine as shown in FIG. 18 are carried out. Among these steps, differences from the steps in the automatic photo-supply mode process sub-routine are that the carriage 301 is moving over a longer distance, and the process time until the panorama photograph ejection becomes longer. This is because the panorama photograph has a longer length than the S-size photograph, At Step S36, after a predetermined time, the transfer motor M1, the first suction fan 503 and the second suction fan 121 stop to complete the panorama mode process sub-routine and the image reading routine.

Incidentally, after the corrections such as the line space correction, the image data read from the photograph is transferred to the control device 430.

In the present embodiment, in order to handle the panorama photograph having a length longer than a specific length, the supply port 10C is disposed at the end portion of the contact glass 300 and, at the same time, the contact glass 300 and the guide frame 108b of the contact glass cover form the first supply path for guiding the panorama photograph inserted through the supply port 10C. Accordingly, the panorama photograph can be transferred to the terminal reference position T without changing the rotating direction of the transfer belt 505 (only the document transfer direction), resulting in the shortened transfer distance by a length for the conventional switchback transfer, and the shortened entire process time.

Further, since the contact glass 300 is disposed substantially vertically and the carriage 301 is elevated along the contact glass 300 to read the image on the photograph, it is possible to reduce the installation space of the image reading apparatus. In the conventional image reading apparatus, since the contact glass 300 is disposed horizontally with respect to the installation surface of the apparatus for the carriage 301 to traverse, it is necessary to have a distance L1 from the home position H to the reference position T including a distance for stabilizing the speed of the carriage 301 to read in a stable manner from the reference position T and a distance for reading the white reference plate 323; and a distance L2 corresponding to the width of the carriage 301 in order to move the carriage 301 to the end of the contact glass 300. Therefore, the casing becomes larger by the distances L1 and L2 in addition to the length of the contact glass 300, resulting in increase in the installation space. In the present image reading apparatus, since the contact glass 300 is disposed substantially vertically and the carriage 301 is moved in the vertical direction, the installation area thereof can be reduced by the distances L1, L2.

Incidentally, in the present embodiment, the panorama photograph is manually fed. However, in the same mariner as in the S-size photograph, a supply device for automatically supplying the panorama photographs to the first supply path may be provided, so that transfer efficiency of the panorama photograph can be improved.

Also, in the present embodiment, in order to reduce the installation area of the image reading apparatus 1, it has been shown that the image reading apparatus of the type where the contact glass 300 is held vertically. However, the present invention can be sufficiently applied to an image reading apparatus wherein the contact glass is held horizontally with respect to the installation surface as generally used and a document transfer device used for this image reading apparatus.

Incidentally, in the present embodiment, the photograph is used as a document. However, the document is not limited to the photograph, and the present invention can be applied to an image reading apparatus for reading images on a document, such as a post card or a general paper like a A4 size paper.

According to the apparatus of the invention, with a simple structure, the transfer distance and transfer time of the document having a length shorter than the specific length can be shortened and, at the same time, the document having a length longer than the specific length can also be shortened.

What is claimed is:

1. A document transfer device for transferring a document to a reading position on a platen of an image reading apparatus, comprising:
   a first supply port for supplying the document onto the platen from one end thereof,
   a first supply path disposed adjacent to said first supply port for guiding the document supplied onto the platen from the first supply port to a downstream side along the platen,
   a platen cover for covering a part of the platen to form the first supply path together with the platen,
   a second supply port located at a downstream side of the platen cover for supplying the document onto the platen at the downstream side of the platen cover different from the first supply port,
   a second supply path connected to the second supply port for supplying the document thereto, and
   a transfer device disposed adjacent to the downstream side of the platen cover for transferring the document from one of the first supply path and the second supply path to the reading position on the platen by one direction transfer of the document, said transfer device partly covering the platen at the downstream side of the platen cover,
   wherein said second supply port directly faces the platen at a position different from the first supply port, and said first supply port is arranged above the second supply port in a vertical direction.

2. An image reading apparatus for reading an image on a document, comprising a platen, a scanning device for scanning the document on the platen while the scanning device is moving along one side of said platen, and said document transfer device according to claim 1 disposed on the other side of the platen and transferring the document to the reading position on the platen.

3. An image reading apparatus according to claim 2, wherein said first supply path is a supply path for guiding a long-size document longer than a predetermined length, and said second supply path is a supply path for guiding a short-size document shorter than the predetermined length.

4. An image reading apparatus according to claim 2, further comprising a device for separating the document one by one and transferring the same, said device being formed in one of said first supply path and said second supply path.

5. An image reading apparatus according to claim 2, wherein said first supply path is a hand-supply path for supplying the document manually.

6. An image reading apparatus for reading an image on a document, comprising:
   a platen,
   a scanning device for scanning the document on the platen while the scanning device is moving along one side of said platen, and
   a document transfer device disposed on the other side of the platen and transferring the document to a reading position on the platen, said document transfer device comprising:
   a supply port to be disposed on one end of said platen for supplying the document,
   a first supply path disposed adjacent to said supply port for guiding the document from the supply port to a downstream side along the platen,
   a platen cover constituting said first supply path and covering a part of the platen,
   a second supply path connected to the first supply path at a downstream side of the platen cover, and
   a transfer device disposed adjacent to the downstream side of the platen cover for transferring the document from one of the first supply path and the second supply path to the platen and covering a part of the platen,
   wherein said platen is disposed substantially vertically, and said scanning device is scanning the document while the scanning device is moving vertically along the one side of the platen.

7. An image reading apparatus according to claim 6, further comprising a supply tray for storing the document integrally formed with the platen cover.

8. An image reading apparatus according to claim 7, wherein said supply tray has a curved portion with respect to the first supply path and a space between the platen and the transfer device.

* * * * *